United States Patent
Toko et al.

(10) Patent No.: US 11,724,732 B2
(45) Date of Patent: Aug. 15, 2023

(54) STEERING CONTROL DEVICE

(71) Applicant: JTEKT CORPORATION, Osaka (JP)

(72) Inventors: Takahiro Toko, Takahama (JP);
Nobuaki Kataoka, Okazaki (JP);
Takafumi Yamaguchi, Kuwana (JP);
Yukinobu Ezaki, Kasugai (JP)

(73) Assignee: JTEKT CORPORATION, Kariya (JP)

( * ) Notice: Subject to any disclaimer, the term of this patent is extended or adjusted under 35 U.S.C. 154(b) by 375 days.

(21) Appl. No.: 17/027,904

(22) Filed: Sep. 22, 2020

(65) Prior Publication Data
US 2021/0094608 A1    Apr. 1, 2021

(30) Foreign Application Priority Data

Sep. 26, 2019   (JP) .................. 2019-175765
Sep. 26, 2019   (JP) .................. 2019-175766

(51) Int. Cl.
*B62D 5/04*    (2006.01)
(52) U.S. Cl.
CPC ......... *B62D 5/0463* (2013.01); *B62D 5/0409* (2013.01)
(58) Field of Classification Search
CPC .. B62D 5/0463; B62D 5/0409; B62D 5/0469; B60W 30/18145
See application file for complete search history.

(56) References Cited

U.S. PATENT DOCUMENTS

| | | | | |
|---|---|---|---|---|
| 2014/0041958 | A1* | 2/2014 | Iijima | B62D 6/04 180/446 |
| 2017/0327144 | A1* | 11/2017 | Sakaguchi | B62D 5/0469 |
| 2018/0346018 | A1* | 12/2018 | Kataoka | B62D 5/0463 |

FOREIGN PATENT DOCUMENTS

| | | | |
|---|---|---|---|
| EP | 3409562 A1 | 12/2018 | |
| JP | H05229445 A * | 2/1992 | ............... B62D 5/04 |
| JP | H06-340270 A | 12/1994 | |
| JP | 2009-029349 A | 2/2009 | |
| JP | 2009-274692 A | 11/2009 | |
| JP | 2016-155519 A | 9/2016 | |
| JP | 2019-104476 A | 6/2019 | |

OTHER PUBLICATIONS

Feb. 17, 2021 Extend Search Report issued in European Patent Application No. 20197794.9.
Apr. 4, 2023 Office Action issued in Japanese Patent Application No. 2019-175765.

* cited by examiner

*Primary Examiner* — Aniss Chad
*Assistant Examiner* — Chase L Cooley
(74) *Attorney, Agent, or Firm* — Oliff PLC

(57) ABSTRACT

A steering control device includes an electronic control unit configured to i) detect an absolute steering angle, ii) determine whether movement of a turning shaft to one of right and left sides has been limited, iii) acquire a limit position determination angle corresponding to the absolute steering angle detected when the electronic control unit determines that the movement of the turning shaft has been limited, and iv) set an end-position-corresponding angle based on the limit position determination angle, the end-position-corresponding angle being an angle indicating that the turning shaft is located at a right or left end position, and the end-position-corresponding angle being associated with the absolute steering angle.

9 Claims, 7 Drawing Sheets

STEERING CONTROL DEVICE

CROSS-REFERENCE TO RELATED APPLICATION

This application claims priority to Japanese Patent Application No. 2019-175765 filed on Sep. 26, 2019 and Japanese Patent Application No. 2019-175766 filed on Sep. 26, 2019, each incorporated herein by reference in its entirety.

BACKGROUND

1. Technical Field

The disclosure relates to a steering control device.

2. Description of Related Art

In the related art, an electric power steering system (EPS) including an actuator with a motor as a drive source is known as a vehicular steering system. As such an EPS, there is an EPS that acquires a steering angle of a steering wheel as an absolute angle in a range including a range exceeding 360° and performs various types of control based on the steering angle. As an example of such control, for example, Japanese Unexamined Patent Application Publication No. 2016-155519 (JP 2016-155519 A) discloses that end contact relaxation control for relaxing (i.e., reducing) an impact of a so-called end contact in which a rack end that is an end of a rack shaft comes into contact with a rack housing is performed.

In the EPS described in JP 2016-155519 A, a rack end position at which movement of the rack shaft is physically limited by an end contact is associated with a steering angle and the angle is stored as an end-position-corresponding angle. In the EPS, an impact of an end contact is relaxed (i.e., reduced) by decreasing a target value of a motor torque which is output from a motor based on a distance of the steering angle from the end-position-corresponding angle.

SUMMARY

For example, depending on specifications of a vehicle, the end-position-corresponding angle may be lost, for example, at the time of turning the ignition off or at the time of replacement of a battery. When the end-position-corresponding angle is lost in this way, for example, end contact relaxation control may not be performed. Therefore, it is necessary to learn an end-position-corresponding angle. At this time, the end-position-corresponding angle needs to accurately correspond to an actual end angle at which an end contact occurs actually.

In the configuration described in JP 2016-155519 A, the end-position-corresponding angle is set based on a steering angle in a state in which the rack shaft is determined to come into contact with the rack housing. In this configuration, conditions for determining that the rack shaft comes into contact with the rack housing include a condition that a state in which a change in the steering angle is equal to or less than a predetermined value continues although a steering torque is input to the EPS.

As a situation in which an end contact occurs, for example, a case in which a driver rapidly performs turning steering and performs return steering immediately after the rack end comes into contact with the rack housing may be supposed. In this instantaneous end contact, the state in which the change in the steering angle is equal to or less than the predetermined value does not continue. Accordingly, in the configuration described in JP 2016-155519 A, the rack shaft may not be determined to have come into contact with the rack housing and thus the end-position-corresponding angle may not be able to be set.

The disclosure provides a steering control device that can learn an end-position-corresponding angle which accurately corresponds to an actual end angle.

The disclosure also provides a steering control device that can set an end-position-corresponding angle based on an instantaneous end contact.

An aspect of the disclosure relates to a steering control device configured to control a steering system including a housing, a turning shaft which is accommodated in the housing such that the turning shaft reciprocates, and an actuator which applies a motor torque for causing the turning shaft to reciprocate using a motor as a drive source. The steering control device includes an electronic control unit configured to i) detect an absolute steering angle which is a rotation angle of a rotation shaft, the rotation angle of the rotation shaft being able to be converted into a turning angle of turning wheels connected to the turning shaft, and the absolute steering angle being expressed as an absolute angle in a range including a range exceeding 360°, ii) determine whether movement of the turning shaft to one of right and left sides has been limited, iii) acquire a limit position determination angle corresponding to the absolute steering angle detected when the electronic control unit determines that the movement of the turning shaft has been limited, and iv) set an end-position-corresponding angle based on the limit position determination angle, the end-position-corresponding angle being an angle indicating that the turning shaft is located at a right or left end position, and the end-position-corresponding angle being associated with the absolute steering angle. In the steering control device according to the aspect, after a value of the limit position determination angle has been acquired, the electronic control unit may not acquire another value of the limit position determination angle until surrounding environment change determination as to whether a surrounding environment around a vehicle has changed is established.

For example, when movement of the turning shaft has been limited due to contact of the turning wheels with a curbstone, a limit position determination angle acquired at this time is an angle different from an actual end angle. Accordingly, when the end-position-corresponding angle is set based on only a single limit position determination angle, the end-position-corresponding angle is likely to be an angle different from the actual end angle. Therefore, it is conceivable to set the end-position-corresponding angle based on a plurality of values of the limit position determination angle. Accordingly, for example, when one value of the limit position determination angle among a plurality of values of the limit position determination angle is acquired at the time of contact with a curbstone and the other values of the limit position determination angle are acquired at the time of an end contact, it is possible to prevent the end-position-corresponding angle from becoming an angle different from the actual end angle. However, for example, when a plurality of values of the limit position determination angle is acquired at the time of contact with a curbstone, there is a concern that the end-position-corresponding angle may become an angle different from the actual end angle even if the end-position-corresponding angle is set based on the plurality of values of the limit position determination angle.

In this regard, according to the above-mentioned configuration, another value of the limit position determination angle is acquired when the surrounding environment around the vehicle has changed after a value of the limit position determination angle has been set. Accordingly, it is possible to prevent occurrence of a situation where each of a plurality of values of the limit position determination angle is data acquired when the movement of the turning shaft has been limited due to contact with a curbstone or the like. As a result, it is possible to set the end-position-corresponding angle which accurately corresponds to the actual end angle.

In the steering control device according to the aspect, a condition for establishing the surrounding environment change determination may include a condition that an amount of return steering is equal to or greater than a return determination threshold value. With this configuration, since the condition for establishing the surrounding environment change determination includes the condition that return steering is performed, it is possible to appropriately determine whether the surrounding environment has changed.

In the steering control device according to the aspect, a condition for establishing the surrounding environment change determination may include a condition that a vehicle speed is equal to or higher than a travel threshold value indicating a non-stopped state of the vehicle. With this configuration, since the condition for establishing the surrounding environment change determination includes the condition that the vehicle is traveling, it is possible to appropriately determine whether the surrounding environment has changed.

In the steering control device according to the aspect, the electronic control unit may be configured to determine whether the movement of the turning shaft has been limited when the vehicle speed is equal to or lower than a low-speed threshold value indicating low-speed travel of the vehicle regardless of whether a signal which is input from a vehicle speed sensor and which indicates the vehicle speed is normal, and when the signal indicating the vehicle speed is abnormal, the condition for establishing the surrounding environment change determination may not include a condition that the vehicle speed is higher than the travel threshold value.

With this configuration, even when a signal which is input from the vehicle sensor and which indicates the vehicle speed is abnormal, the limit position determination angle can be acquired and thus the end-position-corresponding angle can be set promptly. When the signal indicating the vehicle speed is abnormal, the surrounding environment change determination does not include comparison between the vehicle speed and the travel threshold value and thus it is possible to prevent occurrence of a situation where the surrounding environment change determination is not established due to an abnormality of the signal indicating the vehicle speed.

In the steering control device according to the aspect, the electronic control unit may be configured to perform dynamic limitation determination and static limitation determination and to determine that the movement of the turning shaft has been limited when one of the dynamic limitation determination and the static limitation determination is established. When a sign of a steering torque for moving the turning shaft to one side and a sign of a rotation direction of the motor for moving the turning shaft to the one side are defined as being positive and the sign of the steering torque for moving the turning shaft to a side opposite to the one side and the sign of the rotation direction of the motor for moving the turning shaft to the side opposite to the one side are defined as being negative, a condition for establishing the dynamic limitation determination may include a condition that an absolute value of the steering torque is equal to or greater than a first steering torque threshold value and a condition that a sign of an angular velocity change which is a change in an angular velocity of the motor is opposite to the sign of the steering torque and an absolute value of the angular velocity change is greater than a first angular velocity change threshold value, and a condition for establishing the static limitation determination may include a condition that the absolute value of the steering torque is equal to or greater than a second steering torque threshold value greater than the first steering torque threshold value and a condition that the absolute value of the angular velocity change is equal to or less than a second angular velocity change threshold value less than the first angular velocity change threshold value.

With this configuration, when the movement of the turning shaft has been limited in various ways, the limit position determination angle can be acquired and the end-position-corresponding angle can be set promptly. Here, for example, it is assumed that turning steering is rapidly performed (i.e., a steering wheel is rapidly turned) and turning steering is continuously performed without any change after the movement of the turning shaft has been limited due to contact of the turning wheels with a curbstone or the like. In this case, the dynamic limitation determination and the static limitation determination can be established. Accordingly, when the limit position determination angle is acquired at the time of establishment of both determinations, two values of the limit position determination angle are both data acquired when the movement of the turning shaft has been limited due to contact with the curbstone or the like. Thus, in the configuration in which the dynamic limitation determination and the static limitation determination are performed, the effect, which is caused by acquiring another value of the limit position determination angle when the surrounding environment around the vehicle has changed after a value of the limit position determination angle has been acquired, is great.

According to the aspect of the disclosure, it is possible to learn the end-position-corresponding angle that accurately corresponds to the actual end angle.

In the steering control device according to the aspect, the electronic control unit may be configured to perform dynamic limitation determination and to determine that the movement of the turning shaft has been limited when the dynamic limitation determination is established. When a sign of a steering torque for moving the turning shaft to one side and a sign of a rotation direction of the motor for moving the turning shaft to the one side are defined as being positive and the sign of the steering torque for moving the turning shaft to a side opposite to the one side and the sign of the rotation direction of the motor for moving the turning shaft to the side opposite to the one side are defined as being negative, a condition for establishing the dynamic limitation determination may include a condition that an absolute value of the steering torque is equal to or greater than a first steering torque threshold value and a condition that a sign of an angular velocity change which is a change in an angular velocity of the motor is opposite to the sign of the steering torque and an absolute value of the angular velocity change is greater than a first angular velocity change threshold value.

When the turning shaft is moved rapidly to one side by a driver's steering operation and an end contact occurs in a state in which the motor is rapidly rotating, the motor is likely to stop quickly. Accordingly, when the movement of the turning shaft has been limited in this way, the change in the angular velocity of the motor is less than the negative first angular velocity change threshold value, for example, in a state in which a positive steering torque equal to or greater than the first steering torque threshold value is input. That is, when an instantaneous end contact occurs, the dynamic limitation determination can be established. Accordingly, with this configuration, for example, when turning steering is rapidly performed and an instantaneous end contact occurs, it is possible to determine that the movement of the turning shaft has been limited and it is possible to acquire the limit position determination angle and to set the end-position-corresponding angle.

In the steering control device according to the aspect, the condition for establishing the dynamic limitation determination may include a condition that a sign of the angular velocity of the motor is the same as the sign of the steering torque and an absolute value of the angular velocity of the motor is greater than a first angular velocity threshold value.

As described above, after the turning shaft is moved to one side by a driver's steering operation and an instantaneous end contact occurs, the motor rotates in a direction in which the turning shaft moves to one side until the motor stops quickly. Accordingly, with this configuration, since the condition for establishing the dynamic limitation determination includes the condition that the angular velocity of the motor is greater than the first angular velocity threshold value with the same sign as the sign of the steering torque, it is possible to accurately determine whether an instantaneous end contact has occurred.

In the steering control device according to the aspect, the electronic control unit may be configured to determine static limitation determination in addition to the dynamic limitation determination and to determine that the movement of the turning shaft has been limited when one of the dynamic limitation determination and the static limitation determination is established. A condition for establishing the static limitation determination may include a condition that the absolute value of the steering torque is equal to or greater than a second steering torque threshold value greater than the first steering torque threshold value and a condition that the absolute value of the angular velocity change is equal to or less than a second angular velocity change threshold value less than the first angular velocity change threshold value.

When the turning shaft is moved to one side by a driver's steering operation and an end contact occurs, the motor barely rotates in spite of continuation of turning steering. Accordingly, when the movement of the turning shaft has been limited in this way, the absolute value of the change in the angular velocity of the motor is equal to or less than the second angular velocity change threshold value, for example, in a state in which a positive steering torque equal to or greater than the second steering torque threshold value is input. That is, for example, when a steering wheel is held to be stationary after an end contact has occurred, the static limitation determination can be established. Accordingly, with this configuration, for example, when the steering wheel is held to be stationary after an end contact has occurred, it is possible to determine that the movement of the turning shaft has been limited and it is possible to acquire the limit position determination angle and to set the end-position-corresponding angle.

In the above-mentioned configuration, when one of the dynamic limitation determination and the static limitation determination is established, it is determined that the movement of the turning shaft has been limited, and the limit position determination angle is acquired. Accordingly, when the movement of the turning shaft has been limited in various ways, it is possible to acquire the limit position determination angle and to set the end-position-corresponding angle sooner.

In the steering control device according to the aspect, the condition for establishing the static limitation determination may include a condition that a sign of the angular velocity of the motor is the same as the sign of the steering torque and an absolute value of the angular velocity of the motor is greater than a first angular velocity threshold value and equal to or less than a second angular velocity threshold value.

When turning steering is continuously performed even after an end contact has occurred as described above, in a strict sense, the motor rotates slightly due to elastic deformation of the steering system. Accordingly, with this configuration, since the condition for establishing the static limitation determination includes the condition that the angular velocity of the motor is greater than the first angular velocity threshold value with the same sign as the sign of the steering torque and equal to or less than the second angular velocity threshold value, it is possible to accurately determine whether an end contact has occurred continuously.

In the steering control device according to the aspect, the electronic control unit may be configured to acquire, as the limit position determination angle, a value which is obtained by performing rigidity compensation on the absolute steering angle detected when the electronic control unit determines that the movement of the turning shaft has been limited, based on mechanical elastic deformation of the steering system due to a torque applied to the steering system.

With this configuration, it is possible to acquire the accurate limit position determination angle in consideration of elastic deformation of the steering system when it is determined that the movement of the turning shaft has been limited.

In the steering control device according to the aspect, the electronic control unit may be configured to calculate the torque which is applied to the steering system, using the steering torque, the motor torque, and an inertial torque based on the angular velocity change.

With this configuration, since the steering torque, the motor torque, and the inertial torque are considered as torques which are applied to the steering system, it is possible to accurately calculate the amount of elastic deformation of the steering system when it is determined that the movement of the turning shaft has been limited, and to acquire a more accurate limit position determination angle. Particularly, in the dynamic limitation determination, the inertial torque increases due to quick stopping of the motor and thus the effect is great.

According to the aspect of the disclosure, it is possible to set the end-position-corresponding angle based on an instantaneous end contact.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
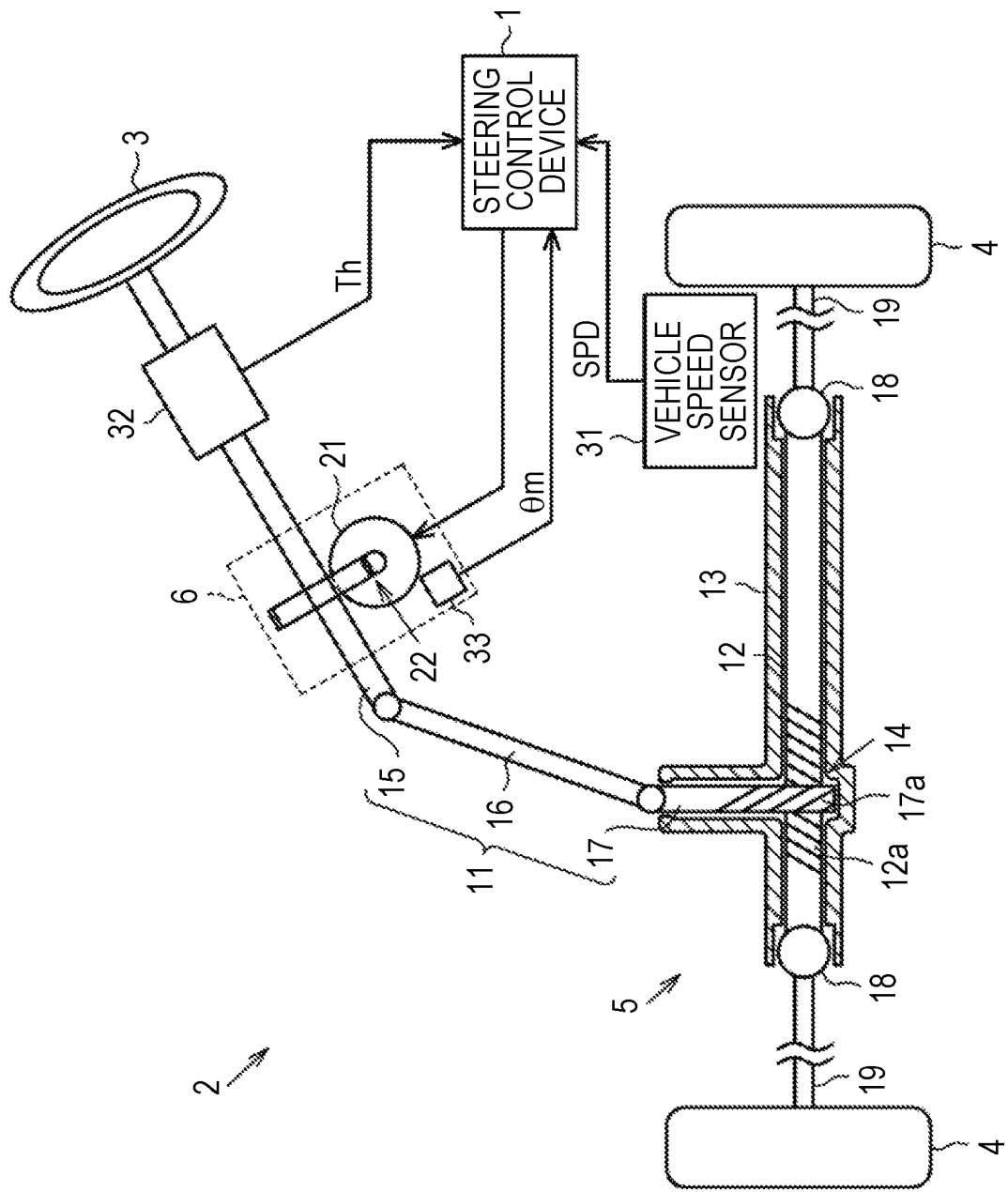
FIG. 1 is a diagram schematically illustrating a configuration of an electric power steering system.

Hereinafter, a steering control device according to a first embodiment of the disclosure will be described with reference to the accompanying drawings. As illustrated in FIG. 1, an electric power steering system (EPS) 2 which is a steering system to be controlled by a steering control device 1 includes a steering mechanism 5 that turns turning wheels 4 based on a driver's operation of a steering wheel 3. The EPS 2 further includes an EPS actuator 6 which is an actuator that applies an assist force for assisting a steering operation to the steering mechanism 5.

The steering mechanism 5 includes a steering shaft 11 to which the steering wheel 3 is fixed, a rack shaft 12 which is a turning shaft connected to the steering shaft 11, a rack housing 13 which is a housing in which the rack shaft 12 is inserted such that the rack shaft 12 reciprocates, and a rack and pinion mechanism 14 that converts a rotational motion of the steering shaft 11 to a reciprocating motion of the rack shaft 12. The steering shaft 11 has a configuration in which a column shaft 15, an intermediate shaft 16, and a pinion shaft 17 are connected sequentially from the side on which the steering wheel 3 is located.

The rack shaft 12 and the pinion shaft 17 are arranged with a predetermined crossing angle in the rack housing 13. The rack and pinion mechanism 14 has a configuration in which rack teeth 12$a$ formed on the rack shaft 12 and pinion teeth 17$a$ formed on the pinion shaft 17 engage with each other. Tie rods 19 are rotatably connected to both ends of the rack shaft 12 via rack ends 18 each of which is formed of a ball joint provided at one shaft end. The distal ends of the tie rods 19 are connected to knuckles (not illustrated) to which the turning wheels 4 are fitted. Accordingly, in the EPS 2, a rotational motion of the steering shaft 11 based on a steering operation is converted to a reciprocating motion in an axial direction of the rack shaft 12 by the rack and pinion mechanism 14 and the reciprocating motion in the axial direction is transmitted to the knuckles via the tie rods 19, whereby a turning angle of the turning wheels 4, that is, a travel direction of a vehicle, is changed.

A position of the rack shaft 12 at which the rack end 18 comes into contact with the left end of the rack housing 13 is a position at which the steering wheel 3 can be maximally steered to the right side, and this position corresponds to a rack end position which is a right end position. A position of the rack shaft 12 at which the rack end 18 comes into contact with the right end of the rack housing 13 is a position at which the steering wheel 3 can be maximally steered to the left side, and this position corresponds to a rack end position which is a left end position.

The EPS actuator 6 includes a motor 21 which is a drive source and a reduction gear mechanism 22 such as a worm and wheel. The motor 21 is connected to the column shaft 15 via the reduction gear mechanism 22. The EPS actuator 6 applies a motor torque as an assist force to the steering mechanism 5 by reducing a rotational motion of the motor 21 using the reduction gear mechanism 22 and transmitting the reduced rotation to the column shaft 15. A three-phase brushless motor is employed as the motor 21 according to this embodiment.

The steering control device 1 is connected to the motor 21 and controls the operation thereof. The steering control device 1 includes a central processing unit (CPU) and a memory which are not illustrated and the CPU executes a program stored in the memory every predetermined calculation cycle. Accordingly, various kinds of control are performed.

A vehicle speed sensor 31 that detects a vehicle speed SPD of the vehicle and a torque sensor 32 that detects a steering torque Th which is applied to the steering shaft 11 according to a driver's steering operation are connected to the steering control device 1. A rotation sensor 33 that detects a rotation angle θm of the motor 21 as a relative angle in a range of 360° is connected to the steering control device 1. The steering torque Th and the rotation angle θm are detected as positive values when the steering wheel 3 is steered to the right side and are detected as negative values when the steering wheel 3 is steered to the left side. That is, in this embodiment, the sign of the steering torque Th and the sign of the rotation direction of the motor 21 for causing the rack shaft 12 to move to the right side corresponding to one side are defined as being positive, and the sign of the steering torque Th and the sign of the rotation direction of the motor 21 for causing the rack shaft 12 to move to the left side corresponding to the side opposite to the one side are defined as being negative. The steering control device 1 controls the operation of the EPS actuator 6, that is, an assist force which is applied to the steering mechanism 5 such that the rack shaft 12 can reciprocate, by supplying drive electric power to the motor 21 based on signals indicating state quantities which are input from the sensors.

Figure 2:
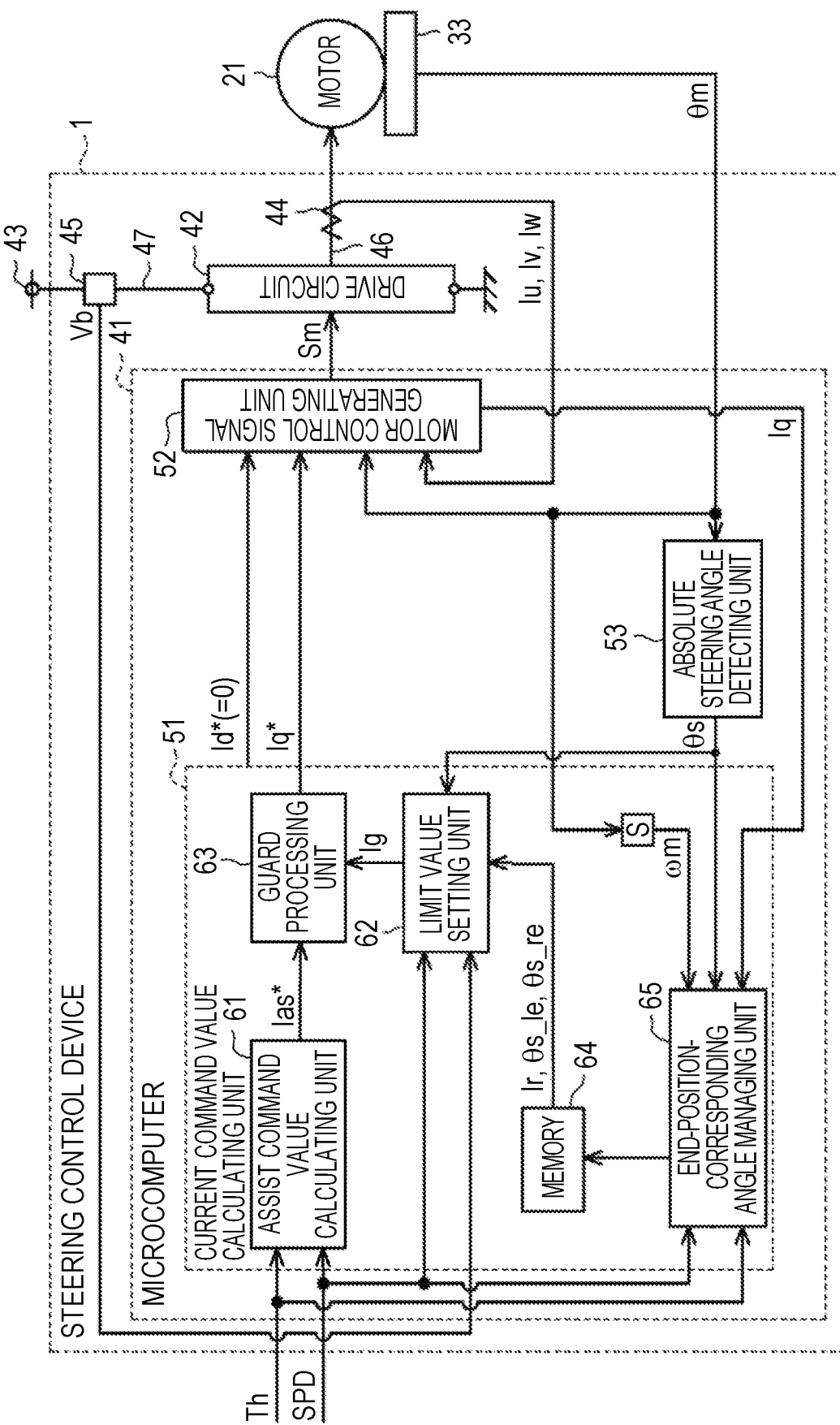
FIG. 2 is a block diagram illustrating a steering control device.

The configuration of the steering control device 1 will be described below. As illustrated in FIG. 2, the steering control device 1 includes a microcomputer 41 that outputs a motor control signal Sm and a drive circuit 42 that supplies drive electric power to the motor 21 based on the motor control signal Sm. In other words, the steering control device 1 includes an electronic control unit (ECU) including the above-described central processing unit (CPU) and the above-described memory. A known PWM inverter including a plurality of switching elements such as FETs is employed as the drive circuit 42 according to this embodiment. The motor control signal Sm which is output from the microcomputer 41 determines ON and OFF states of the switching elements. Accordingly, the switching elements are turned on and off in response to the motor control signal Sm and a pattern of electric power supply to a motor coil of each phase is switched, whereby DC power of an onboard power supply 43 is converted into three-phase drive electric power and is output to the motor 21.

Control blocks which will be described below are realized by a computer program which is executed by the microcomputer 41, state quantities are detected every predetermined sampling cycle, and calculation processes assigned to the following control blocks are performed every predetermined calculation cycle.

The vehicle speed SPD, the steering torque Th, and the rotation angle θm of the motor 21 are input to the microcomputer 41. Phase current values Iu, Iv, and Iw of the motor 21 which are detected by a current sensor 44 and a source voltage Vb of the onboard power supply 43 which is detected by a voltage sensor 45 are also input to the microcomputer 41. The current sensor 44 is provided on a connection line 46 between the drive circuit 42 and the motor coil of each phase. The voltage sensor 45 is provided on a connection line 47 between the onboard power supply 43 and the drive circuit 42. In FIG. 2, for the purpose of convenience of description, a group of the current sensors 44 of the phases is illustrated as one current sensor 44 and a group of the connection lines 46 of the phases is illustrated as one connection line 46. The microcomputer 41 outputs a motor control signal Sm based on the input state quantities.

Specifically, the microcomputer 41 includes a current command value calculating unit 51 that calculates current command values Id* and Iq*, a motor control signal generating unit 52 that outputs a motor control signal Sm based on the current command values Id* and Iq*, and an absolute steering angle detecting unit 53 that detects an absolute steering angle θs.

The steering torque Th, the vehicle speed SPD, and the absolute steering angle θs are input to the current command value calculating unit 51. The current command value calculating unit 51 calculates the current command values Id* and Iq* based on the input state quantities. The current command values Id* and Iq* are target values of currents to be supplied to the motor 21 and are a current command value on a d axis and a current command value on a q axis, respectively, in a d/q coordinate system. Among these, the q-axis current command value Iq* represents a target value of a motor torque which is output from the motor 21. In this embodiment, the d-axis current command value Id* is basically fixed to zero. For example, the current command values Id* and Iq* have positive values when steering to the right side is assisted, and have negative values when steering to the left side is assisted.

The current command values Id* and Iq*, the phase current values Iu, Iv, and Iw, and the rotation angle θm of the motor 21 are input to the motor control signal generating unit 52. The motor control signal generating unit 52 generates the motor control signal Sm by performing current feedback control in the d/q coordinate system based on the input state quantities.

Specifically, the motor control signal generating unit 52 calculates a d-axis current value Id and a q-axis current value Iq which are actual current values of the motor 21 in the d/q coordinate system by mapping the phase current values Iu, Iv, and Iw onto the d/q coordinate system based on the rotation angle θm. Then, the motor control signal generating unit 52 generates the motor control signal Sm by performing current feedback control such that the d-axis current value Id follows the d-axis current command value Id* and the q-axis current value Iq follows the q-axis current command value Iq*. The q-axis current value Iq which is calculated in the process of generating the motor control signal Sm is output to the current command value calculating unit 51.

The motor control signal generating unit 52 outputs the generated motor control signal Sm to the drive circuit 42. Accordingly, by supplying drive electric power based on the motor control signal Sm to the motor 21 and outputting a motor torque based on the q-axis current command value Iq* from the motor 21, an assist force is applied to the steering mechanism 5.

The rotation angle θm is input to the absolute steering angle detecting unit 53. The absolute steering angle detecting unit 53 detects an absolute motor angle which is expressed as an absolute angle in a range including a range exceeding 360° based on the rotation angle θm. The absolute steering angle detecting unit 53 in this embodiment integrates (i.e., accumulates) the number of rotations of the motor 21, for example, with an origin at the rotation angle θm when a start switch such as an ignition switch is turned on for the first time after the onboard power supply 43 has been replaced, and detects an absolute motor angle based on the integrated number of rotations and the rotation angle θm. Then, the absolute steering angle detecting unit 53 detects an absolute steering angle θs indicating a steering angle of the steering shaft 11 by multiplying the absolute motor angle by a conversion factor based on a reduction gear ratio of the reduction gear mechanism 22. In the steering control device 1 according to this embodiment, even when the start switch is turned off, the rotation of the motor 21 is monitored and the number of rotations of the motor 21 is integrated normally. Accordingly, even when the start switch is turned on a second time or later after the onboard power supply 43 has been replaced, the origin of the absolute steering angle θs is the same as the origin which was set when the start switch was turned on for the first time.

Since the turning angle of the turning wheels 4 is changed by the rotation of the steering shaft 11 as described above, the absolute steering angle θs indicates a rotation angle of a rotation shaft which can be converted to the turning angle of the turning wheels 4. The absolute motor angle and the absolute steering angle θs have positive values when they are angles from the origin toward the right side and have negative values when they are angles from the origin toward the left side.

The configuration of the current command value calculating unit 51 will be described below. The current command value calculating unit 51 includes an assist command value calculating unit 61 that calculates an assist command value Ias* which is a base component of the q-axis current command value Iq*, a limit value setting unit 62 that sets a limit value Ig which is an upper limit of the absolute value of the q-axis current command value Iq*, and a guard processing unit 63 that limits the absolute value of the assist command value Ias* such that the absolute value of the assist command value Ias* is equal to or less than the limit value Ig. The current command value calculating unit 51 further includes an end-position-corresponding angle managing unit 65 that manages end-position-corresponding angles θs_re and θs_le which are the absolute steering angles θs corresponding to right and left rack end positions and which are stored in a memory 64.

The steering torque Th and the vehicle speed SPD are input to the assist command value calculating unit 61. The assist command value calculating unit 61 calculates the assist command value Ias* based on the steering torque Th and the vehicle speed SPD. Specifically, the assist command value calculating unit 61 calculates the assist command value Ias* such that the assist command value Ias* has a larger absolute value as the absolute value of the steering torque Th becomes greater and as the vehicle speed SPD becomes lower. The calculated assist command value Ias* is output to the guard processing unit 63.

The limit value Ig set by the limit value setting unit 62, in addition to the assist command value Ias*, is input to the guard processing unit 63 as will be described later. When the absolute value of the input assist command value Ias* is equal to or less than the limit value Ig, the guard processing unit 63 outputs the value of the assist command value Ias* to the motor control signal generating unit 52 as the q-axis current command value Iq* without any change. On the other hand, when the absolute value of the input assist command value Ias* is greater than the limit value Ig, the guard processing unit 63 outputs a value obtained by limiting the absolute value of the assist command value Ias* to the limit value Ig to the motor control signal generating unit 52 as the q-axis current command value Iq*.

The rated current Ir which is a maximum current corresponding to a torque that is set in advance as a motor torque which can be output from the motor 21, end-position-corresponding angles θs_re and θs_le, and the like are stored in the memory 64. The left end-position-corresponding angle θs_le is the absolute steering angle θs corresponding to the left rack end position, and the right end-position-corresponding angle θs_re is the absolute steering angle θs corresponding to the right rack end position. Setting of the end-position-corresponding angles θs_re and θs_le is managed by the end-position-corresponding angle managing unit 65 as will be described later. For example, a memory of a type that maintains the end-position-corresponding angles θs_re and θs_le as long as the onboard power supply 43 is not detached is used as the memory 64 in this embodiment.

The configuration of the limit value setting unit 62 will be described below. The absolute steering angle θs, the vehicle speed SPD, the source voltage Vb, the rated current Ir, and the end-position-corresponding angles θs_re and θs_le are input to the limit value setting unit 62. The limit value setting unit 62 sets the limit value Ig based on the input state quantities.

Figure 3:
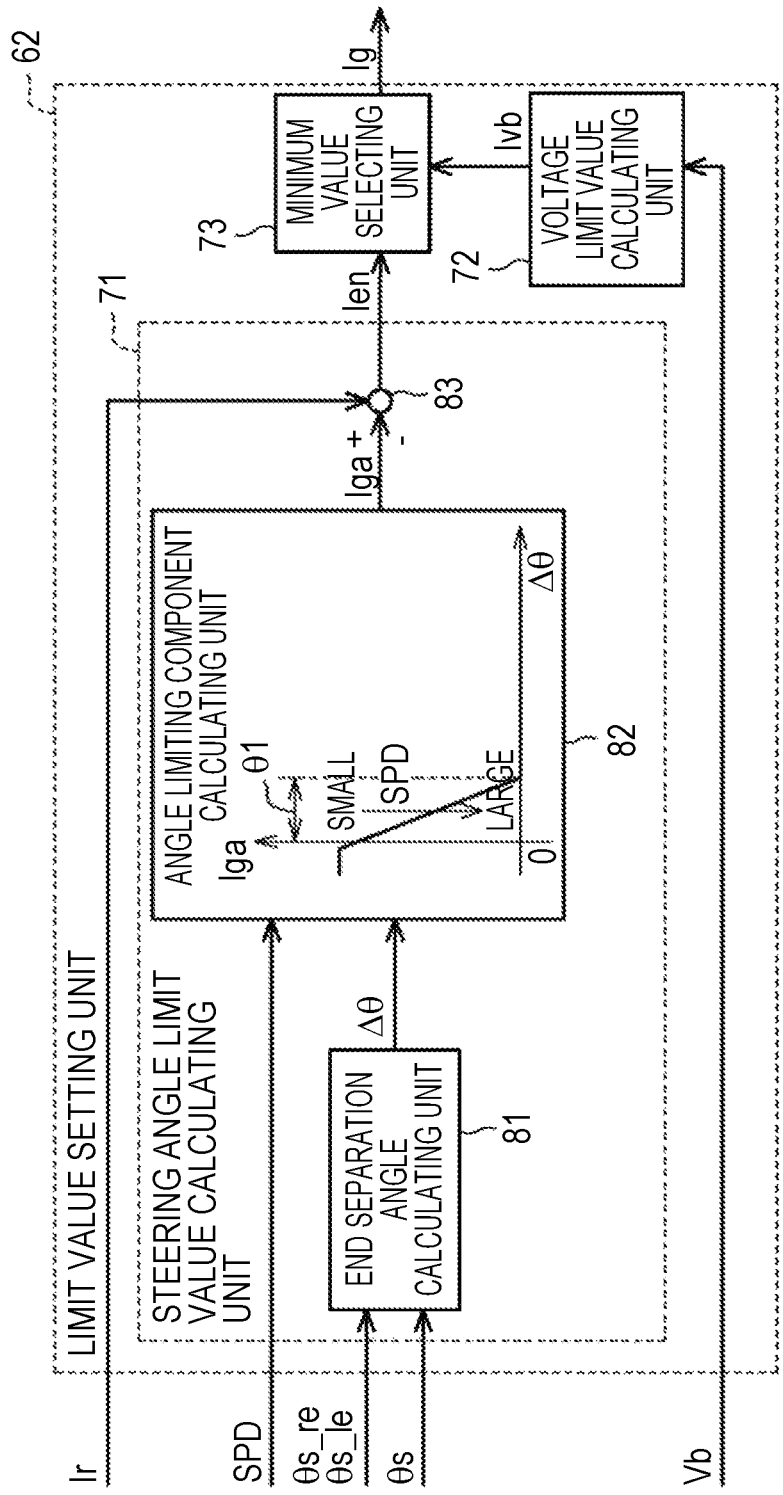
FIG. 3 is a block diagram illustrating a limit value setting unit.

Specifically, as illustrated in FIG. 3, the limit value setting unit 62 includes a steering angle limit value calculating unit 71 that calculates a steering angle limit value Ien based on the absolute steering angle θs, a voltage limit value calculating unit 72 that calculates a voltage limit value Ivb which is another limit value based on the source voltage Vb, and a minimum value selecting unit 73 that selects the smaller of the steering angle limit value Ten and the voltage limit value Ivb.

The absolute steering angle θs, the vehicle speed SPD, the rated current Ir, and the end-position-corresponding angles θs_re and θs_le are input to the steering angle limit value calculating unit 71. The steering angle limit value calculating unit 71 calculates the steering angle limit value Ten which decreases with a decrease of an end separation angle Δθ indicating a minimum distance of the absolute steering angle θs from the right or left end-position-corresponding angle θs_re or θs_le based on the input state quantities when the end separation angle Δθ is equal to or less than a predetermined angle θ1 as will be described later. The calculated steering angle limit value Ten is output to the minimum value selecting unit 73. The steering angle limit value calculating unit 71 does not calculate the steering angle limit value Ten when none of the right and left end-position-corresponding angles θs_re and θs_le are set in the memory 64.

The source voltage Vb is input to the voltage limit value calculating unit 72. The voltage limit value calculating unit 72 calculates the voltage limit value Ivb less than a rated voltage for supplying the rated current Ir when the absolute value of the source voltage Vb is equal to or less than a preset voltage threshold value Vth. Specifically, when the absolute value of the source voltage Vb is equal to or less than the voltage threshold value Vth, the voltage limit value calculating unit 72 calculates the voltage limit value Ivb having an absolute value which decreases with a decrease of the absolute value of the source voltage Vb. The calculated voltage limit value Ivb is output to the minimum value selecting unit 73.

The minimum value selecting unit 73 selects the smaller of the input steering angle limit value Ten and the input voltage limit value Ivb as the limit value Ig and outputs the selected one to the guard processing unit 63. When the steering angle limit value Ten is output as the limit value Ig to the guard processing unit 63, the absolute value of the q-axis current command value Iq* is limited to the steering angle limit value Ten. Accordingly, end contact relaxation control for relaxing (i.e., reducing) an impact of an end contact in which the rack end 18 comes into contact with the rack housing 13 is performed by decreasing the absolute value of the q-axis current command value Iq* with the decrease of the end separation angle Δθ when the end separation angle Δθ is equal to or less than the predetermined angle θ1. As will be described later, regular end contact relaxation control is performed when the right and left end-position-corresponding angles θs_re and θs_le are both stored in the memory 64, and temporary end contact relaxation control is performed when one of the right and left end-position-corresponding angles θs_re and θs_le is stored in the memory 64.

When the voltage limit value Ivb is output as the limit value Ig to the guard processing unit 63, the absolute value of the q-axis current command value Iq* is limited to the voltage limit value Ivb. Accordingly, when the absolute value of the source voltage Vb is equal to or less than the voltage threshold value Vth, power supply protection control for decreasing the absolute value of the q-axis current command value Iq* with the decrease of the absolute value of the source voltage Vb is performed.

The configuration of the steering angle limit value calculating unit 71 will be described below. The steering angle limit value calculating unit 71 includes an end separation angle calculating unit 81 that calculates the end separation angle Δθ and an angle limiting component calculating unit 82 that calculates an angle limiting component Iga which is a current limit determined based on the end separation angle Δθ. The steering angle limit value calculating unit 71 calculates the steering angle limit value Ten by subtracting the angle limiting component Iga from the rated current Ir.

Specifically, the absolute steering angle θs and the end-position-corresponding angles θs_re and θs_le are input to the end separation angle calculating unit 81. When both the right and left end-position-corresponding angles θs_re and θs_le are stored in the memory 64, the end separation angle calculating unit 81 calculates a difference between the absolute steering angle θs and the left end-position-corresponding angle θs_le in the newest calculation cycle and a difference between the absolute steering angle θs and the right end-position-corresponding angle θs_re in the newest calculation cycle. Then, the end separation angle calculating unit 81 outputs the smaller absolute value of the calculated differences as the end separation angle Δθ to the angle limiting component calculating unit 82 and the excess angular velocity calculating unit 83. On the other hand, when only one of the right and left end-position-corresponding angles θs_re and θs_le is stored in the memory 64, the end separation angle calculating unit 81 calculates a difference between the absolute steering angle θs and the end-position-corresponding angle θs_le or the end-position-corresponding angle θs_re in the newest calculation cycle.

Then, the end separation angle calculating unit 81 outputs the calculated difference as the end separation angle $\Delta\theta$ to the angle limiting component calculating unit 82.

The end separation angle calculating unit 81 does not calculate the end separation angle $\Delta\theta$ when none of the right and left end-position-corresponding angles $\theta s\_re$ and $\theta s\_le$ is stored in the memory 64. Accordingly, in the angle limiting component calculating unit 82 which will be described later, the angle limiting component Iga is not calculated and the steering angle limit value Ten is not calculated.

The end separation angle $\Delta\theta$ and the vehicle speed SPD are input to the angle limiting component calculating unit 82. The angle limiting component calculating unit 82 includes a map in which a relationship between the end separation angle $\Delta\theta$ and the vehicle speed SPD and the angle limiting component Iga is defined and calculates the angle limiting component Iga corresponding to the end separation angle $\Delta\theta$ and the vehicle speed SPD with reference to the map.

In this map, the angle limiting component Iga is set to decrease as the end separation angle $\Delta\theta$ increases from a zero state, to reach zero when the end separation angle $\Delta\theta$ is a predetermined angle $\theta 1$, and to be zero when the end separation angle $\Delta\theta$ is greater than the predetermined angle $\theta 1$. In this map, an area in which the end separation angle $\Delta\theta$ is negative is also set, and the angle limiting component Iga increases in proportion to a decrease of the end separation angle $\Delta\theta$ when the end separation angle $\Delta\theta$ becomes less than zero and is kept constant after the angle limiting component Iga becomes equal to the rated current Ir. The negative area in the map is set on the assumption that the motor 21 rotates with elastic deformation of the EPS 2 when turning steering is further performed (i.e., the steering wheel 3 is further turned) in a state in which the rack end 18 is in contact with the rack housing 13. The predetermined angle $\theta 1$ is set to a small angle indicating a range close to the end-position-corresponding angles $\theta s\_re$ and $\theta s\_le$. That is, the angle limiting component Iga is set to decrease when the absolute steering angle $\theta s$ transitions from the end-position-corresponding angles $\theta s\_re$ and $\theta s\_le$ to the neutral steering position and to be zero when the absolute steering angle $\theta s$ is located closer to the neutral steering position than to the vicinities of the end-position-corresponding angles $\theta s\_re$ and $\theta s\_le$.

In this map, the angle limiting component Iga is set to decrease with an increase of the vehicle speed SPD in an area in which the end separation angle $\Delta\theta$ is equal to or less than the predetermined angle $\theta 1$. Specifically, the angle limiting component Iga is set to be greater than zero when the vehicle speed SPD is in a low-speed area, and the angle limiting component Iga is set to be zero when the vehicle speed SPD is in a middle-speed or high-speed area. The calculated angle limiting component Iga is output to a subtractor 83.

The rated current Ir, in addition to the angle limiting component Iga, is input to the subtractor 83. The steering angle limit value calculating unit 71 outputs a value obtained by subtracting the angle limiting component Iga from the rated current Ir in the subtractor 83 as the steering angle limit value Ten to the minimum value selecting unit 73.

The configuration of the end-position-corresponding angle managing unit 65 will be described below. As illustrated in FIG. 2, the vehicle speed SPD, the steering torque Th, the absolute steering angle $\theta s$, the q-axis current value Iq, and a motor angular velocity $\omega m$ obtained by differentiating the rotation angle $\theta m$ are input to the end-position-corresponding angle managing unit 65. The end-position-corresponding angle managing unit 65 determines whether movement of the rack shaft 12 to one of the right and left sides has been limited based on the input state quantities, and acquires a plurality of limit position determination angles $\theta i$ (i.e., a plurality of values of the limit position determination angle $\theta i$) corresponding to the absolute steering angle $\theta s$ when it is determined that movement of the rack shaft 12 has been limited. Then, the end-position-corresponding angle managing unit 65 stores the end-position-corresponding angles $\theta s\_re$ and $\theta s\_le$ based on the plurality of limit position determination angles $\theta i$ in the memory 64. After the end-position-corresponding angles $\theta s\_re$ and $\theta s\_le$ have been stored in the memory 64 once, the end-position-corresponding angle managing unit 65 does not perform processes associated with setting of the end-position-corresponding angles $\theta s\_re$ and $\theta s\_le$ until they are lost.

Figure 4:
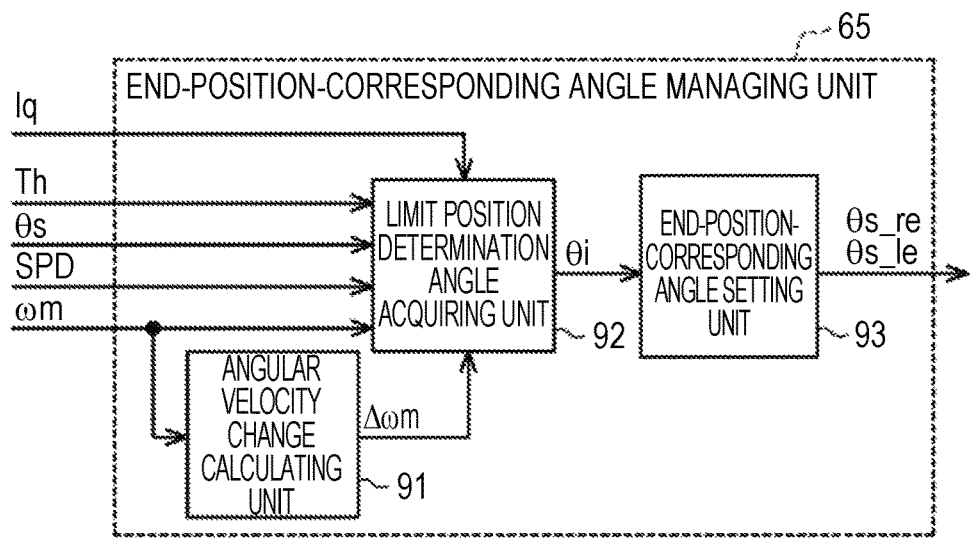
FIG. 4 is a block diagram illustrating an end-position-corresponding angle managing unit.

Specifically, as illustrated in FIG. 4, the end-position-corresponding angle managing unit 65 includes an angular velocity change calculating unit 91, a limit position determination angle acquiring unit 92, and an end-position-corresponding angle setting unit 93. A motor angular velocity $\omega m$ is input to the angular velocity change calculating unit 91. The angular velocity change calculating unit 91 calculates an angular velocity change $\Delta\omega m$ which is a change (i.e., an amount of change) of the motor angular velocity $\omega m$ based on the input motor angular velocity $\omega m$. Then, the angular velocity change calculating unit 91 outputs the angular velocity change $\Delta\omega m$ to the limit position determination angle acquiring unit 92. The angular velocity change calculating unit 91 in this embodiment outputs a value obtained by performing a low-pass filtering process on the angular velocity change $\Delta\omega m$ to the limit position determination angle acquiring unit 92.

The vehicle speed SPD, the steering torque Th, the q-axis current value Iq, the motor angular velocity $\omega m$, the angular velocity change $\Delta\omega m$, and the absolute steering angle $\theta s$ are input to the limit position determination angle acquiring unit 92. As will be described later, the limit position determination angle acquiring unit 92 determines whether movement of the rack shaft 12 to one of the right and left sides has been limited based on the input state quantities, and acquires the limit position determination angles $\theta i$ corresponding to the absolute steering angle $\theta s$ when it is determined that movement of the rack shaft 12 has been limited.

The plurality of limit position determination angles $\theta i$ from the limit position determination angle acquiring unit 92 is input to the end-position-corresponding angle setting unit 93. When the limit position determination angles $\theta i$ on the right and left sides are acquired, the end-position-corresponding angle setting unit 93 sets the end-position-corresponding angles $\theta s\_re$ and $\theta s\_le$ based on the limit position determination angles $\theta i$ on the right and left sides. The end-position-corresponding angle setting unit 93 determines with which of the right and left sides each limit position determination angle $\theta i$ is associated, based on the sign of the limit position determination angle $\theta i$.

Specifically, when the limit position determination angles $\theta i$ on the right and left sides are acquired, the end-position-corresponding angle setting unit 93 first calculates a stroke width Wma which is a sum of the absolute values of the limit position determination angle $\theta i$ on the right side and the limit position determination angle $\theta i$ on the left side. When the stroke width Wma is greater than a stroke threshold value Wth, the end-position-corresponding angle setting unit 93 sets the acquired limit position determination angles $\theta i$ on the right and left sides as the end-position-corresponding angles θs_re and θs_le without any change. The stroke threshold value Wth is an angle range which is expressed by the absolute steering angle θs and is set to a range which is slightly less than an angle range corresponding to an entire stroke range of the rack shaft 12. When the stroke width Wma is equal to or less than the stroke threshold value Wth, the end-position-corresponding angle setting unit 93 does not set the end-position-corresponding angles θs_re and θs_le, discards the input limit position determination angles θi, and performs the same processes when the limit position determination angles θi on the right and left sides are acquired again.

On the other hand, when a plurality of limit position determination angles θi on only one of the right and left sides is acquired, the end-position-corresponding angle setting unit 93 sets only the end-position-corresponding angle θs_re or θs_le on the corresponding side based on the acquired limit position determination angles θi. Specifically, the end-position-corresponding angle setting unit 93 sets an average value of the plurality of limit position determination angles θi as the end-position-corresponding angle θs_re on the right or the end-position-corresponding angle θs_le on the left side.

Acquisition of the limit position determination angles θi which is performed by the limit position determination angle acquiring unit 92 will be described below. When a signal indicating the vehicle speed SPD which is input from the vehicle speed sensor 31 is normal and the vehicle speed SPD is higher than a low-speed threshold value Slo, the limit position determination angle acquiring unit 92 does not determine whether movement of the rack shaft 12 has been limited. This is because an end contact does not occur due to spinning of the vehicle or the like when the vehicle speed SPD is high to some extent and the steering wheel 3 is steered to the rack end position. For example, when the vehicle speed SPD has a value which is not possible or when a change thereof from a previous value is greater than a preset threshold value, the limit position determination angle acquiring unit 92 may determine that the signal indicating the vehicle speed SPD is abnormal. The low-speed threshold value Slo is a vehicle speed indicating that the vehicle is traveling at a low speed and is set in advance.

When the signal indicating the vehicle speed SPD is abnormal or when the vehicle speed SPD is equal to or lower than the low-speed threshold value Slo, the limit position determination angle acquiring unit 92 performs dynamic limitation determination. When the dynamic limitation determination has been continuously established for a first predetermined time, the limit position determination angle acquiring unit 92 acquires the limit position determination angles θi corresponding to the absolute steering angle θs detected when the determination has been continuously established for the first predetermined time. On the other hand, when dynamic limitation determination is not established, the limit position determination angle acquiring unit 92 performs static limitation determination. When static limitation determination has been continuously established for a second predetermined time, the limit position determination angle acquiring unit 92 acquires the limit position determination angles θi corresponding to the absolute steering angle θs detected when the determination has been continuously established for the second predetermined time.

Static limitation determination is determination for detecting a state in which the steering wheel is held to be stationary while movement of the rack shaft 12 has been limited and a state in which slow turning steering is performed and movement of the rack shaft 12 has been limited.

Dynamic limitation determination is determination for detecting a state in which turning steering is performed relatively fast and return steering is performed (i.e., the steering wheel is returned) immediately after movement of the rack shaft 12 has been limited.

The limit position determination angle acquiring unit 92 in this embodiment performs rigidity compensation for performing correction based on mechanical elastic deformation of the EPS 2 caused by a torque applied to the EPS 2, on the absolute steering angle θs detected when it is determined that movement of the rack shaft 12 has been limited as the result of dynamic limitation determination or static limitation determination, and acquires angles after the rigidity compensation as the limit position determination angles θi.

After one limit position determination angle θi (i.e., one value of the limit position determination angle θi) has been acquired, the limit position determination angle acquiring unit 92 does not acquire another limit position determination angle θi (i.e., another value of the limit position determination angle θi) until surrounding environment change determination as to whether the surrounding environment around the vehicle has changed is established.

The processes which are performed by the limit position determination angle acquiring unit 92 will be described below in detail in the order of dynamic limitation determination, static limitation determination, rigidity compensation, and surrounding environment change determination.

Dynamic Limitation Determination

When the following three conditions are satisfied, the limit position determination angle acquiring unit 92 determines that dynamic limitation determination is established and movement of the rack shaft 12 has been limited.

(a1) The absolute value of the steering torque Th is equal to or greater than a first steering torque threshold value Tth1.
(a2) The sign of the motor angular velocity ωm is the same as the sign of the steering torque Th and the absolute value of the motor angular velocity ωm is greater than a first angular velocity threshold value ωth1.
(a3) The sign of the angular velocity change Δωm is opposite to the sign of the steering torque Th and the absolute value of the angular velocity change Δωm is greater than a first angular velocity change threshold value Δωth1. The first steering torque threshold value Tth1 is a steering torque when return steering is performed immediately after the rack end 18 comes into contact with the rack housing 13 and is set to an appropriate value which is greater than zero. The first angular velocity threshold value ωth1 is an angular velocity indicating that the motor 21 is in a stopped state and is set to substantially zero. The first angular velocity change threshold value Δωth1 is a change in the angular velocity indicating that the motor 21 is decelerating rapidly and is set to a relatively large value.

Static Limitation Determination

When the following three conditions are satisfied, the limit position determination angle acquiring unit 92 determines that static limitation determination is established and movement of the rack shaft 12 has been limited.

(b1) The absolute value of the steering torque Th is equal to or greater than a second steering torque threshold value Tth2. (b2) The sign of the motor angular velocity ωm is the same as the sign of the steering torque Th and the absolute value of the motor angular velocity ωm is greater than the first angular velocity threshold value ωth1 and equal to or less than a second angular velocity threshold value ωth2.
(b3) The absolute value of the angular velocity change Δωm is less than a second angular velocity change threshold value Δωth2. The second steering torque threshold value Tth2 is a steering torque required to hold the steering wheel 3 when the vehicle is turned in a state in which the rack end 18 is in contact with the rack housing 13 and is set to an appropriate value greater than the first steering torque threshold value Tth1. The second angular velocity threshold value ωth2 is an angular velocity indicating that the motor 21 rotates at a low speed and is set to an appropriate value greater than zero. The second angular velocity change threshold value Δωth2 is a change in the angular velocity indicating that the motor 21 is not substantially accelerating or decelerating and is set to a value which is less than the first angular velocity change threshold value Δωth1 and slightly greater than zero.

Rigidity Compensation

The limit position determination angle acquiring unit 92 acquires, as the limit position determination angle θi, a value obtained by subtracting mechanical elastic deformation caused in the EPS 2 from the absolute steering angle θs detected when it is determined that movement of the rack shaft 12 has been limited.

Specifically, the limit position determination angle acquiring unit 92 calculates a pinion shaft torque Tp which is a sum of torques applied to the EPS 2 when it is determined that movement of the rack shaft 12 has been limited. The pinion shaft torque Tp corresponds to an axial force acting on the rack shaft 12. As expressed by Expression (1), the limit position determination angle acquiring unit 92 in this embodiment calculates the pinion shaft torque Tp using the steering torque Th which is applied by a driver, a motor torque based on the q-axis current value Iq, and an inertial torque based on the angular velocity change Δωm of the motor 21.

$$Tp = Th + Iq \times Km + \Delta\omega m \times K\omega \quad (1)$$

"Km" denotes a coefficient which is determined by a motor constant of the motor 21, a reduction gear ratio and efficiency of the reduction gear mechanism 22, and the like. "Kω" denotes a coefficient which is determined from the inertial moment of the motor 21, a reduction gear ratio and efficiency of the reduction gear mechanism 22, and the like.

Figure 5:
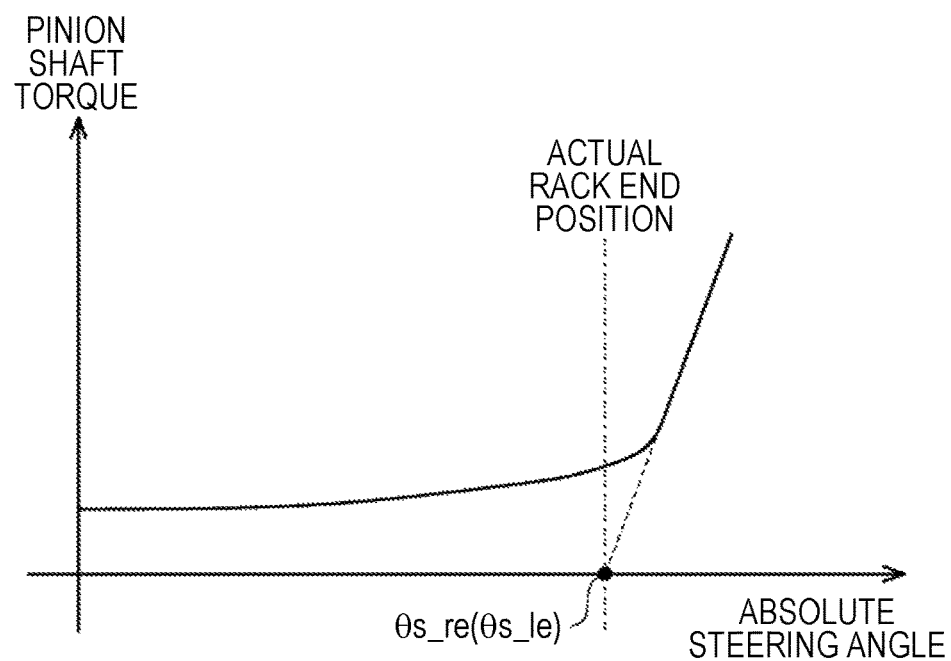
FIG. 5 is a diagram schematically illustrating a relationship between an absolute steering angle and a pinion shaft torque.

As illustrated in FIG. 5, in general, when a steering operation is performed by a driver, the turning wheels 4 are turned and the absolute steering angle θs increases in accordance with the pinion shaft torque Tp applied to the EPS 2. At an angle slightly greater than the absolute steering angle θs corresponding to an actual rack end position, the absolute steering angle θs hardly increases even when the pinion shaft torque Tp increases for the following reason. Since movement of the rack shaft 12 has been limited by an end contact, the motor 21 merely rotates slightly due to twist of the steering shaft 11 constituting the EPS 2 or mechanical elastic deformation such as compression of the rack shaft 12 when the pinion shaft torque Tp increases. Since the gradient of the pinion shaft torque Tp with respect to the absolute steering angle θs is proportional to an elastic coefficient Ke of the EPS 2, the absolute steering angle θs at a position, at which the pinion shaft torque Tp is zero on a line along the gradient from the absolute steering angle θs serving as a base point, substantially corresponds to the actual rack end position.

Taking this into consideration, the limit position determination angle acquiring unit 92 calculates the rotation angle of the motor 21 based on an amount of elastic deformation of the EPS 2 by multiplying the pinion shaft torque Tp by the elastic coefficient Ke of the EPS 2. The limit position determination angle acquiring unit 92 acquires, as the limit position determination angle θi, a value obtained by subtracting the rotation angle from the absolute steering angle θs detected when it is determined that movement of the rack shaft 12 has been limited.

Surrounding Environment Change Determination

When two following conditions are satisfied, the limit position determination angle acquiring unit 92 determines that surrounding environment change determination is established and the surrounding environment around the vehicle has changed. The limit position determination angle acquiring unit 92 does not determine whether the condition (c2) is satisfied when the signal indicting the vehicle speed SPD is abnormal, and determines that surrounding environment change determination is established when the condition (c1) is satisfied.

(c1) A return steering amount θba is equal to or greater than a return determination threshold value θth. (c2) When the signal indicating the vehicle speed SPD which is input from the vehicle speed sensor 31 is normal, the vehicle speed SPD is equal to or higher than a travel threshold value Smin.

The return steering amount θba is a difference between the latest limit position determination angle θi and the absolute steering angle θs. The return determination threshold value θth is an angle at which a driver is considered to have performed return steering and is set in advance to, for example, a relatively large value of approximately 100°. The travel threshold value Smin is a minimum vehicle speed indicating that the vehicle has not stopped and is traveling, and is set in advance to a value which is higher than zero and lower than the low-speed threshold value Slo.

Flowchart

An example of a process routine which is performed by the limit position determination angle acquiring unit 92 will be described with reference to the flowcharts illustrated in FIGS. 6 to 9. In the following description, for the purpose of convenience of description, it is assumed that the rack shaft 12 moves to the right side and the limit position determination angle θi on the right side is acquired. However, the same process routine is performed when the rack shaft 12 moves to the left side and the limit position determination angle θi on the left side is acquired.

Figure 6:
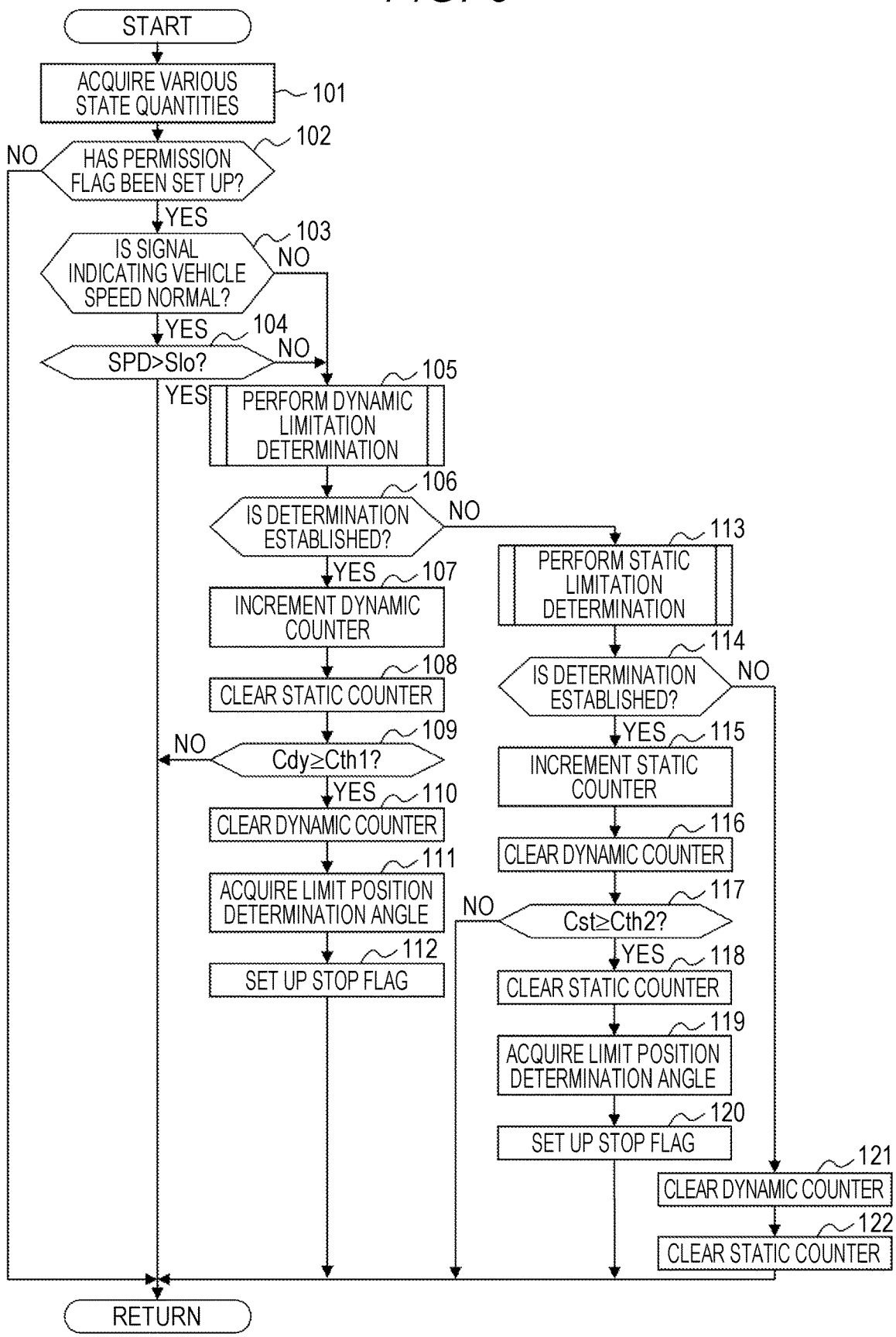
FIG. 6 is a flowchart illustrating a process routine of acquiring a limit position determination angle which is performed by a limit position determination angle acquiring unit.

As illustrated in FIG. 6, when various state quantities are acquired at the time of acquisition of the limit position determination angle θi (Step 101), the limit position determination angle acquiring unit 92 determines whether a permission flag indicating that acquisition of the limit position determination angle θi is permitted is set up (Step 102). The permission flag is set up in an initial state and is reset when the limit position determination angle θi is acquired. The permission flag is set up again when surrounding environment change determination is established in a reset state.

When the permission flag is not set up (Step 102: NO), the limit position determination angle acquiring unit 92 does not perform the processes subsequent thereto and does not acquire the limit position determination angle θi in the same calculation cycle. On the other hand, when the permission flag is set up (Step 102: YES), the limit position determination angle acquiring unit 92 determines whether the signal indicating the vehicle speed SPD is normal (Step 103). When the signal indicating the vehicle speed SPD is normal (Step 103: YES), the limit position determination angle acquiring unit 92 determines whether the vehicle speed SPD is higher than the low-speed threshold value Slo (Step 104). When the vehicle speed SPD is higher than the low-speed threshold value Slo (Step 104: YES), the limit position determination angle acquiring unit 92 does not perform the processes subsequent thereto and does not acquire the limit position determination angle θi in the same calculation cycle. On the other hand, when the signal indicating the vehicle speed SPD is not normal (Step 103: NO) and the vehicle speed SPD is equal to or lower than the low-speed threshold value Slo (Step 104: NO), the limit position determination angle acquiring unit 92 performs dynamic limitation determination (Step 105).

Figure 7:
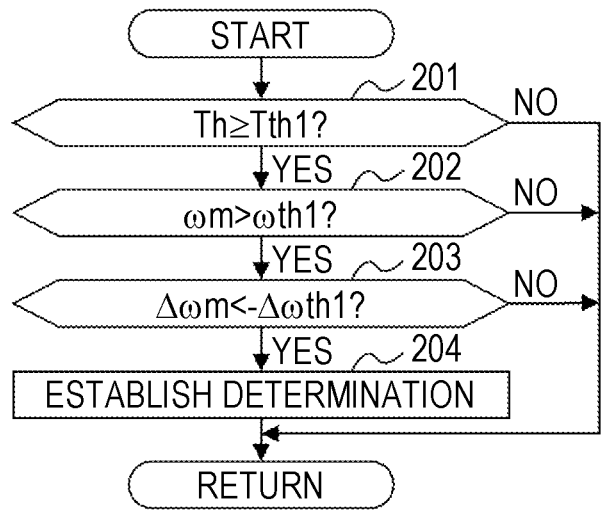
FIG. 7 is a flowchart illustrating a process routine of dynamic limitation determination which is performed by the limit position determination angle acquiring unit.

As illustrated in FIG. 7, in dynamic limitation determination, the limit position determination angle acquiring unit 92 determines whether the steering torque Th is equal to or greater than the first steering torque threshold value Tth1 (Step 201). When the steering torque Th is equal to or greater than the first steering torque threshold value Tth1 (Step 201: YES), the limit position determination angle acquiring unit 92 determines whether the motor angular velocity ωm is greater than the first angular velocity threshold value ωth1 (Step 202). That is, in Step 202, the limit position determination angle acquiring unit 92 determines whether the sign of the motor angular velocity ωm is the same as the sign of the steering torque Th and the absolute value of the motor angular velocity ωm is greater than the first angular velocity threshold value ωth1. When the motor angular velocity ωm is greater than the first angular velocity threshold value ωth1 (Step 202: YES), the limit position determination angle acquiring unit 92 determines whether the angular velocity change Δωm is less than the negative first angular velocity change threshold value Δωth1 (Step 203). That is, in Step 203, the limit position determination angle acquiring unit 92 determines whether the sign of the angular velocity change Δωm is opposite to the sign of the steering torque Th and the absolute value of the angular velocity change Δωm is greater than the first angular velocity change threshold value Δωth1. When the angular velocity change Δωm is less than the negative first angular velocity change threshold value Δωth1 (Step 203: YES), the limit position determination angle acquiring unit 92 determines that dynamic limitation determination is established and movement of the rack shaft 12 has been limited (Step 204).

On the other hand, when the steering torque Th is less than the first steering torque threshold value Tth1 (Step 201: NO), when the motor angular velocity ωm is equal to or less than the first angular velocity threshold value ωth1 (Step 202: NO), and when the angular velocity change Δωm is equal to or greater than the negative first angular velocity change threshold value Δωth1 (Step 203: NO), the limit position determination angle acquiring unit 92 does not perform the processes subsequent thereto.

As illustrated in FIG. 6, after dynamic limitation determination has been performed in Step 105, the limit position determination angle acquiring unit 92 determines whether the determination is established (Step 106). When the dynamic limitation determination is established (Step 106: YES), the limit position determination angle acquiring unit 92 increments a count value Cdy of a dynamic counter indicating the number of times dynamic limitation determination has been established (Step 107) and clears a count value Cst of a static counter indicating the number of times static limitation determination has been established (Step 108). Subsequently, the limit position determination angle acquiring unit 92 determines whether the count value Cdy of the dynamic counter is equal to or greater than a predetermined count value Cth1 corresponding to the first predetermined time (Step 109), and does not perform the processes subsequent thereto when the count value Cdy is less than the predetermined count value Cth1 (Step 109: NO).

On the other hand, when the count value Cdy is equal to or greater than the predetermined count value Cth1 (Step 109: YES), the limit position determination angle acquiring unit 92 clears the count value Cdy of the dynamic counter (Step 110). Then, the limit position determination angle acquiring unit 92 acquires the limit position determination angle θi by performing rigidity compensation on the absolute steering angle θs acquired in the same calculation cycle (Step 111), and sets up a stop flag indicating that acquisition of the limit position determination angle θi is stopped until surrounding environment change determination is established (Step 112).

Figure 8:
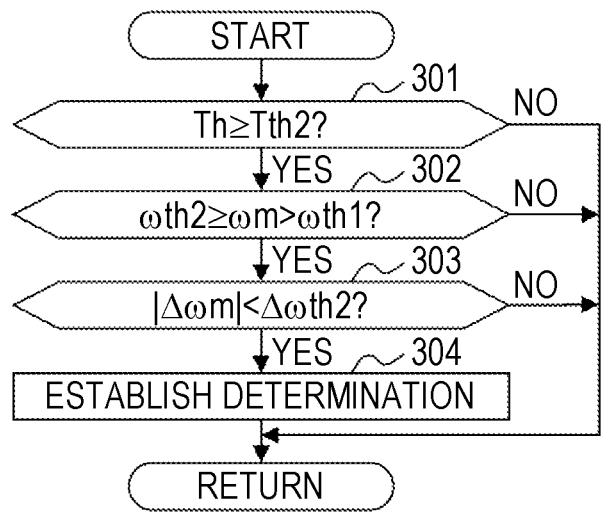
FIG. 8 is a flowchart illustrating a process routine of static limitation determination which is performed by the limit position determination angle acquiring unit.

When dynamic limitation determination is not established (Step 106: NO), the limit position determination angle acquiring unit 92 performs static limitation determination (Step 113). As illustrated in FIG. 8, in static limitation determination, the limit position determination angle acquiring unit 92 determines whether the steering torque Th is equal to or greater than the second steering torque threshold value Tth2 (Step 301). When the steering torque Th is equal to or greater than the second steering torque threshold value Tth2 (Step 301: YES), the limit position determination angle acquiring unit 92 determines whether the motor angular velocity ωm is greater than the first angular velocity threshold value ωth1 and is equal to or less than the second angular velocity threshold value ωth2 (Step 302). That is, in Step 302, the limit position determination angle acquiring unit 92 determines whether the sign of the motor angular velocity ωm is the same as the sign of the steering torque Th and the absolute value of the motor angular velocity ωm is greater than the first angular velocity threshold value ωth1 and equal to or less than the second angular velocity threshold value ωth2. When the motor angular velocity ωm is greater than the first angular velocity threshold value ωth1 and equal to or less than the second angular velocity threshold value ωth2, that is, when the motor 21 rotates at a very low speed (Step 302: YES), the limit position determination angle acquiring unit 92 determines whether the absolute value of the angular velocity change Δωm is less than the second angular velocity change threshold value Δωth2 (Step 303). When the absolute value of the angular velocity change Δωm is less than the second angular velocity change threshold value Δωth2 (Step 303: YES), the limit position determination angle acquiring unit 92 determines that static limitation determination is established and movement of the rack shaft 12 has been limited (Step 304).

On the other hand, when the steering torque Th is less than the second steering torque threshold value Tth2 (Step 301: NO), when the motor angular velocity ωm is equal to or less than the first angular velocity threshold value ωth1 or greater than the second angular velocity threshold value ωth2 (Step 302: NO), and when the absolute value of the angular velocity change Δωm is equal to or greater than the second angular velocity change threshold value Δωth2 (Step 303: NO), the limit position determination angle acquiring unit 92 does not perform the processes subsequent thereto.

As illustrated in FIG. 6, after static limitation determination has been performed in Step 113, the limit position determination angle acquiring unit 92 determines whether the determination is established (Step 114). When the static limitation determination is established (Step 114: YES), the limit position determination angle acquiring unit 92 increments the count value Cst of the static counter (Step 115) and clears the count value Cdy of the dynamic counter (Step 116). Subsequently, the limit position determination angle acquiring unit 92 determines whether the count value Cst of the static counter is equal to or greater than a predetermined count value Cth2 corresponding to the second predetermined time (Step 117), and does not perform the processes subsequent thereto when the count value Cst is less than the predetermined count value Cth2 (Step 117: NO).

On the other hand, when the count value Cst is equal to or greater than the predetermined count value Cth2 (Step 117: YES), the limit position determination angle acquiring unit 92 clears the count value Cst of the static counter (Step 118). Then, the limit position determination angle acquiring unit 92 acquires the limit position determination angle θi by performing rigidity compensation on the absolute steering angle θs acquired in the same calculation cycle (Step 119), and sets up the stop flag (Step 120).

When static limitation determination is not established (Step 114: NO), that is, when movement of the rack shaft 12 is not limited, the limit position determination angle acquiring unit 92 clears the count values Cdy and Cst of the dynamic counter and the static counter (Steps 121 and 122).

Figure 9:
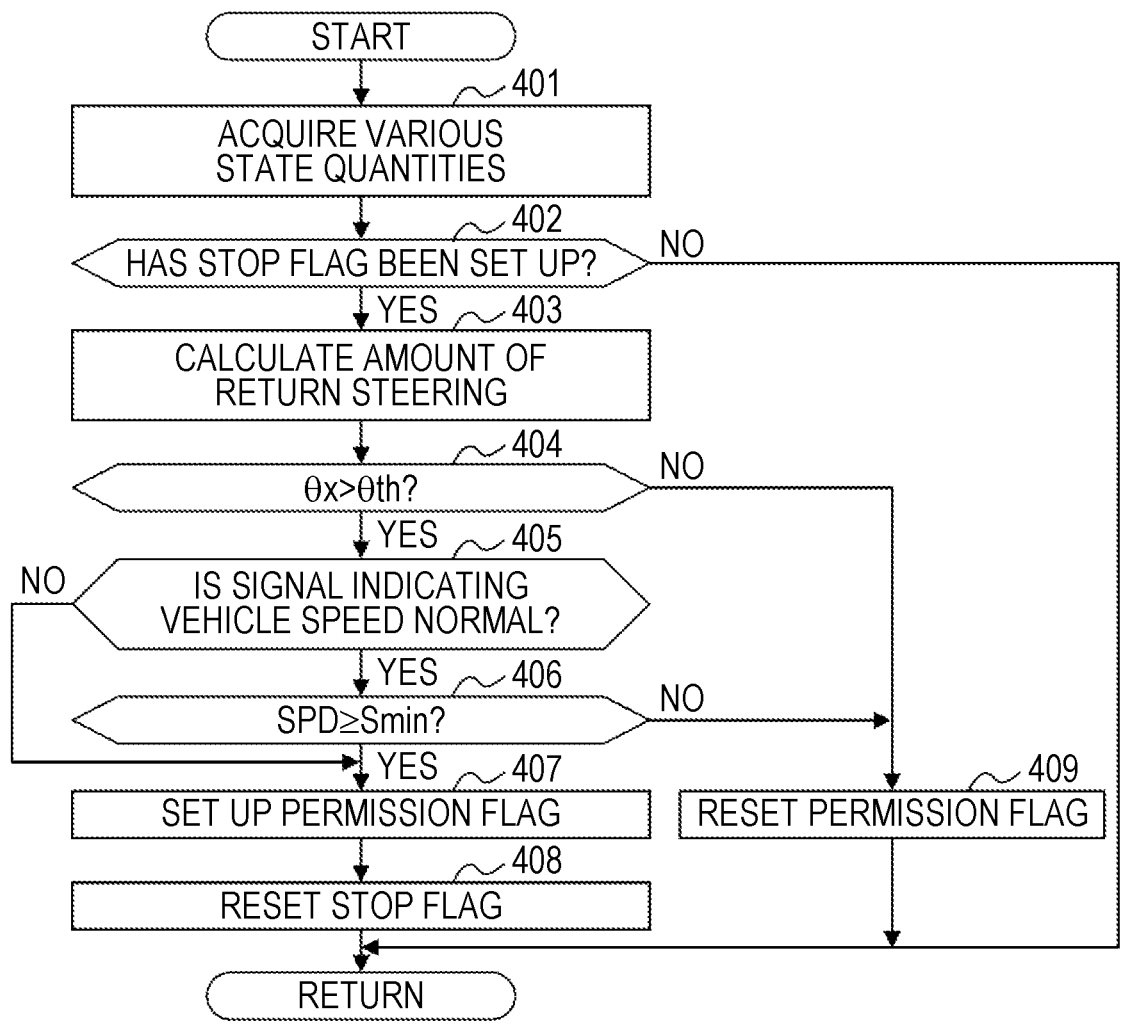
FIG. 9 is a flowchart illustrating a process routine of surrounding environment change determination which is performed by the limit position determination angle acquiring unit.

As illustrated in FIG. 9, in surrounding environment change determination, when various state quantities are acquired (Step 401), the limit position determination angle acquiring unit 92 determines whether the stop flag is set up (Step 402). When the stop flag is not set up (Step 402: NO), that is, when the limit position determination angle θi is not acquired and it is not necessary to determine whether the surrounding environment around the vehicle has changed, the limit position determination angle acquiring unit 92 does not perform the processes subsequent thereto.

On the other hand, when the stop flag is set up (Step 402: YES), the limit position determination angle acquiring unit 92 calculates the return steering amount θba (Step 403) and determines whether the return steering amount θba is greater than the return determination threshold value θth (Step 404). When the return steering amount θba is greater than the return determination threshold value θth (Step 404: YES), the limit position determination angle acquiring unit 92 determines whether the signal indicating the vehicle speed SPD is normal (Step 405). When the signal indicating the vehicle speed SPD is normal (Step 405: YES), the limit position determination angle acquiring unit 92 determines whether the vehicle speed SPD is equal to or higher than the travel threshold value Smin (Step 406). When the vehicle speed SPD is equal to or higher than the travel threshold value Smin (Step 406: YES), the limit position determination angle acquiring unit 92 sets up the permission flag (Step 407) and resets the stop flag (Step 408).

When the vehicle speed SPD is not normal (Step 405: NO), the limit position determination angle acquiring unit 92 skips Step 406 and performs setting up of the permission flag and resetting of the stop flag in Steps 407 and 408. When the return steering amount θba is equal to or less than the return determination threshold value θth (Step 404: NO) and when the vehicle speed SPD is lower than the travel threshold value Smin (Step 406: NO), the limit position determination angle acquiring unit 92 resets the permission flag (Step 409).

Operations and advantageous effects of this embodiment will be described below. The limit position determination angle acquiring unit 92 performs dynamic limitation determination and determines that movement of the rack shaft 12 has been limited when the dynamic limitation determination is established. The conditions for establishing the dynamic limitation determination include the condition that the absolute value of the steering torque Th is equal to or greater than the first steering torque threshold value Tth1 and the condition that the sign of the angular velocity change Δωm is opposite to the sign of the steering torque Th and the absolute value of the angular velocity change Δωm is greater than the first angular velocity change threshold value Δωth1.

For example, when the rack shaft 12 moves rapidly to the right side by a driver's steering operation and an end contact occurs in a state in which the motor 21 is rotating fast, the motor 21 is likely to stop rapidly. Accordingly, when movement of the rack shaft 12 has been limited in this way, the angular velocity change Δωm of the motor 21 is less than the negative first angular velocity change threshold value Δωth1, for example, in a state in which a positive steering torque Th equal to or greater than the first steering torque threshold value Tth1 is input. That is, when an instantaneous end contact occurs, dynamic limitation determination can be established. Accordingly, in this embodiment, for example, when an instantaneous end contact occurs by performing rapid turning steering, it is possible to determine that movement of the rack shaft 12 has been limited and it is possible to acquire the limit position determination angles θi and to set the end-position-corresponding angles θs_re and θs_le.

As described above, for example, after the rack shaft 12 moves to the right side by a driver's steering and an instantaneous end contact occurs, the motor 21 rotates in a direction in which the rack shaft 12 moves to the right side until the motor 21 stops quickly. Accordingly, in this embodiment, since the conditions for establishing the dynamic limitation determination include the condition that the motor angular velocity ωm is greater than the first angular velocity threshold value ωth1 with the same sign as the sign of the steering torque Th, it is possible to accurately determine whether an instantaneous end contact has occurred.

The limit position determination angle acquiring unit 92 performs static limitation determination and determines that movement of the rack shaft 12 has been limited when the static limitation determination is established. The conditions for establishing the static limitation determination include the condition that the absolute value of the steering torque Th is equal to or greater than the second steering torque threshold value Tth2 which is greater than the first steering torque threshold value Tth1 and the condition that the absolute value of the angular velocity change Δωm is equal to or less than the second angular velocity change threshold value Δωth2 which is less than the first angular velocity change threshold value Δωth1.

For example, when the rack shaft 12 moves to the right side by a driver's steering operation and an end contact occurs, the motor 21 barely rotates in spite of continuation of turning steering. Accordingly, when movement of the rack shaft 12 has been limited in this way, the absolute value of the angular velocity change Δωm of the motor 21 is equal to or less than the second angular velocity change threshold value Δωth2, for example, in a state in which a positive steering torque equal to or greater than the second steering torque threshold value Tth2 is input. That is, for example, when the steering wheel is held to be stationary after an end contact has occurred, the static limitation determination can be established. Accordingly, in this embodiment, for example, when the steering wheel is held to be stationary after an end contact has occurred, it is possible to determine that movement of the rack shaft 12 has been limited and it is possible to acquire the limit position determination angles θi and to set the end-position-corresponding angles θs_re and θs_le.

When turning steering is continuously performed even after an end contact has occurred as described above, in a strict sense, the motor 21 rotates slightly due to elastic deformation of the EPS 2. Accordingly, in this embodiment, since the conditions for establishing the static limitation determination include the condition that the motor angular velocity ωm is greater than the first angular velocity threshold value ωth1 with the same sign as the sign of the steering torque Th and equal to or less than the second angular velocity threshold value ωth2, it is possible to accurately determine whether an end contact has occurred continuously.

The limit position determination angle acquiring unit 92 acquires, as the limit position determination angle θi, a value that is obtained by performing rigidity compensation on the absolute steering angle θs detected when it is determined that movement of the rack shaft 12 has been limited, based on mechanical elastic deformation of the EPS 2 due to the pinion shaft torque Tp applied to the EPS 2. Accordingly, it is possible to acquire the accurate limit position determination angle θi in consideration of elastic deformation of the EPS 2 at a time when it is determined that movement of the rack shaft 12 has been limited.

Since the limit position determination angle acquiring unit 92 calculates the pinion shaft torque Tp based on the steering torque Th, the motor torque, and the inertial torque, it is possible to accurately calculate an amount of elastic deformation of the EPS 2 at a time when it is determined that movement of the rack shaft 12 has been limited, and to more accurately set the limit position determination angles θi. Particularly, in the dynamic limitation determination, the inertial torque increases due to quick stopping of the motor 21, and therefore, the effect is great.

Operations and advantageous effects of this embodiment will be described below. For example, when movement of the rack shaft 12 has been limited due to contact of the turning wheels 4 with a curbstone, the limit position determination angle θi acquired at this time is an angle different from an actual rack end angle which is an actual end angle at which an end contact occurs actually. Accordingly, when the end-position-corresponding angle θs_re or θs_le on the corresponding side is set based on only a single limit position determination angle θi, the end-position-corresponding angle θs_re or θs_le is likely to be an angle different from the actual rack end angle. Therefore, it is conceivable to set the end-position-corresponding angle θs_re or θs_le on the corresponding side based on a plurality of limit position determination angles θi (i.e., a plurality of values of the limit position determination angle θi) on one of the right and left sides. Accordingly, for example, even when one of a plurality of limit position determination angles θi is acquired at the time of contact with a curbstone and other limit position determination angles θi are acquired at the time of an end contact, it is possible to prevent the set end-position-corresponding angles θs_re and θs_le from being an angle different from the actual rack end angle. However, for example, when a plurality of limit position determination angles θi is acquired at the time of contact with a curbstone, there is a concern that the end-position-corresponding angle θs_re or θs_le may be an angle different from the actual rack end angle even if the end-position-corresponding angle θs_re or θs_le on the corresponding side is set based on the plurality of limit position determination angles θi on one of the right and left sides.

Taking this point into consideration, after one limit position determination angle θi has been set, the limit position determination angle acquiring unit 92 acquires another limit position determination angle θi after the surrounding environment around the vehicle has changed. Accordingly, it is possible to prevent occurrence of a situation where each of a plurality of limit position determination angles θi is data acquired when movement of the rack shaft 12 has been limited due to contact with a curbstone or the like. As a result, it is possible to set the end-position-corresponding angles θs_re and θs_le which accurately correspond to the actual rack end angle.

Since the conditions for establishing the surrounding environment change determination include the condition that the return steering amount θba is equal to or greater than the return determination threshold value θth and the condition that the vehicle speed SPD is equal to or higher than the travel threshold value Smin, it is possible to accurately determine whether the surrounding environment has changed.

Regardless of whether the signal indicating the vehicle speed SPD which is input from the vehicle speed sensor 31 is normal, the limit position determination angle acquiring unit 92 determines whether movement of the rack shaft 12 has been limited when the vehicle speed SPD is equal to or lower than the low-speed threshold value Slo. Accordingly, since the limit position determination angles θi can be acquired even if an abnormality occurs in the signal indicating the vehicle speed SPD, it is possible to set the end-position-corresponding angles θs_re and θs_le promptly. The limit position determination angle acquiring unit 92 causes the surrounding environment change determination not to include comparison of the vehicle speed SPD with the travel threshold value Smin when the signal indicating the vehicle speed SPD is abnormal. Accordingly, it is possible to prevent occurrence of a situation where the surrounding environment change determination is not established due to an abnormality of the signal indicating the vehicle speed SPD.

The limit position determination angle acquiring unit 92 performs dynamic limitation determination and determines that movement of the rack shaft 12 has been limited when the dynamic limitation determination is established. The conditions for establishing the dynamic limitation determination include the condition that the absolute value of the steering torque Th is equal to or greater than the first steering torque threshold value Tth1 and the condition that the sign of the angular velocity change Δωm is opposite to the sign of the steering torque Th and the absolute value of the angular velocity change Δωm is greater than the first angular velocity change threshold value Δωth1.

For example, when the rack shaft 12 moves rapidly to the right side by a driver's steering operation and an end contact occurs in a state in which the motor 21 rotates fast, the motor 21 is likely to stop quickly. Accordingly, when movement of the rack shaft 12 has been limited in this way, the angular velocity change Δωm of the motor 21 is less than the negative first angular velocity change threshold value Δωth1, for example, in a state in which a positive steering torque Th equal to or greater than the first steering torque threshold value Tth1 is input. That is, when an instantaneous end contact occurs, the dynamic limitation determination can be established. Accordingly, in this embodiment, for example, when turning steering is rapidly performed and an instantaneous end contact occurs, it is possible to determine that movement of the rack shaft 12 has been limited and it is possible to acquire the limit position determination angles θi and to set the end-position-corresponding angles θs_re and θs_le.

As described above, for example, after the rack shaft 12 moves to the right side by a driver's steering operation and an instantaneous end contact has occurred, the motor 21 rotates in a direction in which the rack shaft 12 moves to the right side until the motor 21 stops quickly. Accordingly, in this embodiment, since the conditions for establishing the dynamic limitation determination include the condition that the motor angular velocity $\omega m$ is greater than the first angular velocity threshold value $\omega th1$ with the same sign as the sign of the steering torque Th, it is possible to accurately determine whether an instantaneous end contact has occurred.

The limit position determination angle acquiring unit 92 performs static limitation determination and determines that movement of the rack shaft 12 has been limited when the static limitation determination is established. The conditions for establishing the static limitation determination include the condition that the absolute value of the steering torque Th is equal to or greater than the second steering torque threshold value Tth2 which is greater than the first steering torque threshold value Tth1 and the condition that the absolute value of the angular velocity change $\Delta\omega m$ is equal to or less than the second angular velocity change threshold value $\Delta\omega th2$ which is less than the first angular velocity change threshold value $\Delta\omega th1$.

For example, when the rack shaft 12 moves to the right side by a driver's steering operation and an end contact occurs, the motor 21 barely rotates in spite of continuation of turning steering. Accordingly, when movement of the rack shaft 12 has been limited in this way, the absolute value of the angular velocity change $\Delta\omega m$ of the motor 21 is equal to or less than the second angular velocity change threshold value $\Delta\omega th2$, for example, in a state in which a positive steering torque equal to or greater than the second steering torque threshold value Tth2 is input. That is, for example, when the steering wheel is held to be stationary after an end contact has occurred, the static limitation determination can be established. Accordingly, in this embodiment, for example, when the steering wheel is held to be stationary after an end contact has occurred, it is possible to determine that movement of the rack shaft 12 has been limited and it is possible to acquire the limit position determination angles $\theta i$ and to set the end-position-corresponding angles $\theta s\_re$ and $\theta s\_le$.

When turning steering is continuously performed even after an end contact has occurred as described above, in a strict sense, the motor 21 rotates slightly due to elastic deformation of the EPS 2. Accordingly, in this embodiment, since the conditions for establishing the static limitation determination include the condition that the motor angular velocity $\omega m$ is greater than the first angular velocity threshold value $\omega th1$ with the same sign as the sign of the steering torque Th and equal to or less than the second angular velocity threshold value $\omega th2$, it is possible to accurately determine whether an end contact has occurred continuously.

The limit position determination angle acquiring unit 92 performs dynamic limitation determination and static limitation determination and determines that movement of the rack shaft 12 has been limited when one of the dynamic limitation determination and the static limitation determination is established. Accordingly, when movement of the rack shaft 12 has been limited in various ways, it is possible to acquire the limit position determination angles $\theta i$ and to set the end-position-corresponding angles $\theta s\_re$ and $\theta s\_le$ sooner.

For example, it is assumed that turning steering has been quickly performed and turning steering is continuously being performed even after movement of the rack shaft 12 has been limited due to contact of the turning wheels 4 with a curbstone or the like. In this case, both dynamic limitation determination and static limitation determination can be established. Accordingly, when two limit position determination angles $\theta i$ are assumed to be acquired when both determinations are established, both the limit position determination angles $\theta i$ are data acquired when movement of the rack shaft 12 has been limited due to contact with the same curbstone. Thus, in the configuration in which the dynamic limitation determination and the static limitation determination are performed, the effect, which is caused by acquiring another limit position determination angle $\theta i$ when the surrounding environment around the vehicle has changed after one limit position determination angle $\theta i$ is set as in this embodiment, is great.

The limit position determination angle acquiring unit 92 acquires, as the limit position determination angle $\theta i$, a value that is obtained by performing rigidity compensation on the absolute steering angle $\theta s$ detected when it is determined that movement of the rack shaft 12 has been limited, based on mechanical elastic deformation of the EPS 2 due to the pinion shaft torque Tp applied to the EPS 2. Accordingly, it is possible to acquire the accurate limit position determination angle $\theta i$ in consideration of elastic deformation of the EPS 2 at a time when it is determined that movement of the rack shaft 12 has been limited.

Since the limit position determination angle acquiring unit 92 calculates the pinion shaft torque Tp based on the steering torque Th, the motor torque, and the inertial torque, it is possible to accurately calculate an amount of elastic deformation of the EPS 2 at a time when it is determined that movement of the rack shaft 12 has been limited and to set more accurate limit position determination angles $\theta i$. Particularly, in the dynamic limitation determination, the inertial torque increases due to quick stopping of the motor 21, and therefore, the effect is great.

The above embodiments can be modified as follows. The above embodiments and the following modified examples can be combined unless technical confliction arises. In the embodiments, when the signal indicating the vehicle speed SPD is normal and the vehicle speed SPD is higher than the low-speed threshold value Slo, it may also be determined whether movement of the rack shaft 12 has been limited. When the signal indicating the vehicle speed SPD which is input from the vehicle speed sensor 31 is abnormal, it may not be determined whether movement of the rack shaft 12 has been limited.

In the embodiments, when the signal indicating the vehicle speed SPD is abnormal, the surrounding environment change determination may also include comparison of the vehicle speed SPD with the travel threshold value Smin. In the embodiment, the limit position determination angle acquiring unit 92 determines whether movement of the rack shaft 12 has been limited by performing the dynamic limitation determination and the static limitation determination, but the disclosure is not limited thereto and it may be determined whether movement of the rack shaft 12 has been limited by performing only one of the dynamic limitation determination and the static limitation determination. By performing only the dynamic limitation determination without performing the static limitation determination, it may be determined whether movement of the rack shaft 12 has been limited.

In the embodiments, the conditions for establishing the surrounding environment change determination include the conditions (c1) and (c2) are satisfied, but the disclosure is not limited thereto, and for example, determination regarding the condition (c1) may not be performed as long as the surrounding environment around the vehicle can be determined to have changed. For example, in addition to or instead of the condition (c2), the surroundings of the vehicle may be imaged using an imaging device such as a camera and it may be determined whether the captured image has changed. For example, positioning signals may be received from artificial satellites for a Global Positioning System (GPS) and it may be determined whether the position of the vehicle has changed by a predetermined distance or more based on the received positioning signals. For example, it may be determined that the surrounding environment around the vehicle has changed with the elapse of several minutes, and the conditions for the surrounding environment change determination can be appropriately modified.

In the embodiments, when the conditions (a1) and (a3) are satisfied, it may be determined that the dynamic limitation determination is established even if the condition (a2) is not satisfied. Regardless of whether the dynamic limitation determination is established continuously for the first predetermined time, the limit position determination angle θi may be acquired as long as it is established in only one calculation cycle.

In the embodiments, when the conditions (b1) and (b3) are satisfied, it may be determined that the static limitation determination is established even if the condition (b2) is not satisfied. Regardless of whether the static limitation determination is established continuously for the second predetermined time, the limit position determination angle θi may be acquired as long as it is established in only one calculation cycle.

In the embodiments, the pinion shaft torque Tp is calculated based on the steering torque Th, the motor torque, and the inertial torque, but the disclosure is not limited thereto and the pinion shaft torque Tp may be calculated, for example, based on the steering torque Th and the motor torque for the purpose of a decrease in calculation load. The pinion shaft torque Tp used for rigidity compensation which is performed on the absolute steering angle θs acquired as the result of the dynamic limitation determination may be different from the pinion shaft torque Tp used for rigidity compensation which is performed on the absolute steering angle θs acquired as the result of the static limitation determination.

In the embodiments, the absolute steering angle θs acquired when it is determined that movement of the rack shaft 12 has been limited may be acquired as the limit position determination angle θi without any change and rigidity compensation may not be performed thereon.

In the embodiments, when a plurality of limit position determination angles θi on only one of the right and left sides is acquired, an average value thereof is set as the end-position-corresponding angle θs_re or θs_le on the corresponding side. However, the disclosure is not limited thereto and, for example, the limit position determination angle θi having the greatest absolute angle among the plurality of limit position determination angles θi may be set as the end-position-corresponding angle θs_re or θs_le on the corresponding side. When only one limit position determination angle θi is acquired, the limit position determination angle θi may be set as the end-position-corresponding angle θs_re or θs_le on the corresponding side.

In the embodiments, after one limit position determination angle θi has been acquired, another limit position determination angle θi may be acquired as long as it is determined that movement of the rack shaft 12 has been limited, even when surrounding environment change determination of determining whether the surrounding environment around the vehicle has changed is not established.

In the embodiments, by monitoring the rotation of the motor 21 even when the ignition switch is turned off, the number of rotations of the motor 21 from the origin is normally integrated, and the absolute motor angle and the absolute steering angle θs are detected. However, the disclosure is not limited thereto and, for example, a steering sensor that detects a steering angle as an absolute angle may be provided, the number of rotations of the motor 21 from the origin may be integrated based on the steering angle detected by the steering sensor and the reduction gear ratio of the reduction gear mechanism 22, and the absolute motor angle and the absolute steering angle θs may be detected.

In the embodiments, end contact relaxation control is performed by limiting the assist command value Ias* to the steering angle limit value Ien, but the disclosure is not limited thereto. End contact relaxation control may be performed, for example, by adding a steering reaction component that increases as the rack shaft approaches the rack end position, that is, a component with a sign opposite to the sign of the assist command value Ias*, to the assist command value Ias*.

In the embodiments, a guard process is performed on the assist command value Ias*, but the disclosure is not limited thereto and, for example, the guard process may be performed on a value obtained by correcting the assist command value Ias* using a compensation value based on a torque differential value obtained by differentiating the steering torque Th.

In the embodiments, the limit value setting unit 62 includes the voltage limit value calculating unit 72 that calculates the voltage limit value Ivb based on the source voltage Vb, but the disclosure is not limited thereto and another calculation unit that calculates another limit value based on another state quantity may be provided in addition to or instead of the voltage limit value calculating unit 72. A configuration in which the limit value setting unit 62 does not include the voltage limit value calculating unit 72 and sets the steering angle limit value Ten as the limit value Ig without any change may be employed.

In the embodiments, a value obtained by subtracting the angle limiting component Iga from the rated current Ir is used as the steering angle limit value Ten, but the disclosure is not limited thereto. A value obtained by subtracting the angle limiting component Iga and an amount of current limitation which is determined by the motor angular velocity from the rated current Ir may be used as the steering angle limit value Ten.

In the embodiments, the steering control device 1 controls the EPS 2 of a type in which the EPS actuator 6 applies a motor torque to the column shaft 15, but the disclosure is not limited thereto and, for example, the steering control device 1 may control a steering system of a type in which a motor torque is applied to the rack shaft 12 via a ball screw nut. The disclosure is not limited to the EPS. The steering control device 1 may control a steer-by-wire type steering device in which transmission of power between a steering unit which is operated by a driver and a turning unit that turns the turning wheels is cut off, and end contact relaxation control may be performed on a torque command value or a q-axis current command value of a motor of a turning actuator which is provided in the turning unit as in this embodiment.

What is claimed is:

1. A steering control device configured to control a steering system including a housing, a turning shaft which is accommodated in the housing such that the turning shaft reciprocates, and an actuator which applies a motor torque for causing the turning shaft to reciprocate using a motor as a drive source, the steering control device comprising an electronic control unit configured to
i) detect an absolute steering angle which is a rotation angle of a rotation shaft, the rotation angle of the rotation shaft being able to be converted into a turning angle of turning wheels connected to the turning shaft, and the absolute steering angle being expressed as an absolute angle in a range including a range exceeding 360°,
ii) determine whether movement of the turning shaft to one of right and left sides has been limited,
iii) acquire a limit position determination angle corresponding to the absolute steering angle detected when the electronic control unit determines that the movement of the turning shaft has been limited, and
iv) set an end-position-corresponding angle based on the limit position determination angle, the end-position-corresponding angle being an angle indicating that the turning shaft is located at a right or left end position, and the end-position-corresponding angle being associated with the absolute steering angle, wherein:
after a value of the limit position determination angle has been acquired, the electronic control unit does not acquire another value of the limit position determination angle until surrounding environment change determination as to whether a surrounding environment around a vehicle has changed is established,
a condition for establishing the surrounding environment change determination includes a condition that a vehicle speed is equal to or higher than a travel threshold value indicating a non-stopped state of the vehicle,
the electronic control unit is configured to determine whether the movement of the turning shaft has been limited when the vehicle speed is equal to or lower than a low-speed threshold value indicating low-speed travel of the vehicle regardless of whether a signal which is input from a vehicle speed sensor and which indicates the vehicle speed is normal, and
when the signal indicating the vehicle speed is abnormal, the condition for establishing the surrounding environment change determination does not include a condition that the vehicle speed is higher than the travel threshold value.

2. The steering control device according to claim 1, wherein a condition for establishing the surrounding environment change determination includes a condition that an amount of return steering is equal to or greater than a return determination threshold value.

3. The steering control device according to claim 1, wherein the electronic control unit is configured to perform dynamic limitation determination and static limitation determination and to determine that the movement of the turning shaft has been limited when one of the dynamic limitation determination and the static limitation determination is established, and wherein, when a sign of a steering torque for moving the turning shaft to one side and a sign of a rotation direction of the motor for moving the turning shaft to the one side are defined as being positive and the sign of the steering torque for moving the turning shaft to a side opposite to the one side and the sign of the rotation direction of the motor for moving the turning shaft to the side opposite to the one side are defined as being negative, a condition for establishing the dynamic limitation determination includes a condition that an absolute value of the steering torque is equal to or greater than a first steering torque threshold value and a condition that a sign of an angular velocity change which is a change in an angular velocity of the motor is opposite to the sign of the steering torque and an absolute value of the angular velocity change is greater than a first angular velocity change threshold value, and a condition for establishing the static limitation determination includes a condition that the absolute value of the steering torque is equal to or greater than a second steering torque threshold value greater than the first steering torque threshold value and a condition that the absolute value of the angular velocity change is equal to or less than a second angular velocity change threshold value less than the first angular velocity change threshold value.

4. The steering control device according to claim 1, wherein the electronic control unit is configured to perform dynamic limitation determination and to determine that the movement of the turning shaft has been limited when the dynamic limitation determination is established, and wherein, when a sign of a steering torque for moving the turning shaft to one side and a sign of a rotation direction of the motor for moving the turning shaft to the one side are defined as being positive and the sign of the steering torque for moving the turning shaft to a side opposite to the one side and the sign of the rotation direction of the motor for moving the turning shaft to the side opposite to the one side are defined as being negative, a condition for establishing the dynamic limitation determination includes a condition that an absolute value of the steering torque is equal to or greater than a first steering torque threshold value and a condition that a sign of an angular velocity change which is a change in an angular velocity of the motor is opposite to the sign of the steering torque and an absolute value of the angular velocity change is greater than a first angular velocity change threshold value.

5. The steering control device according to claim 4, wherein the condition for establishing the dynamic limitation determination includes a condition that a sign of the angular velocity of the motor is the same as the sign of the steering torque and an absolute value of the angular velocity of the motor is greater than a first angular velocity threshold value.

6. The steering control device according to claim 4, wherein the electronic control unit is configured to determine static limitation determination in addition to the dynamic limitation determination and to determine that the movement of the turning shaft has been limited when one of the dynamic limitation determination and the static limitation determination is established, and wherein a condition for establishing the static limitation determination includes a condition that the absolute value of the steering torque is equal to or greater than a second steering torque threshold value greater than the first steering torque threshold value and a condition that the absolute value of the angular velocity change is equal to or less than a second angular velocity change threshold value less than the first angular velocity change threshold value.

7. The steering control device according to claim 6, wherein the condition for establishing the static limitation determination includes a condition that a sign of the angular velocity of the motor is the same as the sign of the steering torque and an absolute value of the angular velocity of the motor is greater than a first angular velocity threshold value and equal to or less than a second angular velocity threshold value.

8. The steering control device according to claim 4, wherein the electronic control unit is configured to acquire, as the limit position determination angle, a value which is obtained by performing rigidity compensation on the absolute steering angle detected when the electronic control unit determines that the movement of the turning shaft has been limited, based on mechanical elastic deformation of the steering system due to a torque applied to the steering system.

9. The steering control device according to claim 8, wherein the electronic control unit is configured to calculate the torque which is applied to the steering system, using the steering torque, the motor torque, and an inertial torque based on the angular velocity change.

* * * * *